(12) United States Patent
Fukagawa et al.

(10) Patent No.: US 9,201,173 B2
(45) Date of Patent: Dec. 1, 2015

(54) POLARIZER PROTECTIVE FILM, POLARIZER, AND LIQUID CRYSTAL DISPLAY DEVICE

(75) Inventors: Nobutaka Fukagawa, Kanagawa (JP); Masaki Noro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 255 days.

(21) Appl. No.: 13/200,985

(22) Filed: Oct. 6, 2011

(65) Prior Publication Data

US 2012/0088041 A1 Apr. 12, 2012

(30) Foreign Application Priority Data

Oct. 7, 2010 (JP) .................................. 2010-227417
Aug. 19, 2011 (JP) .................................. 2011-179705

(51) Int. Cl.
*G02B 1/14* (2015.01)
*C09K 19/54* (2006.01)
*C08K 5/3435* (2006.01)
*G02B 1/10* (2015.01)

(52) U.S. Cl.
CPC ................ *G02B 1/14* (2015.01); *C08K 5/3435* (2013.01); *C09K 19/54* (2013.01); *B32B 2457/202* (2013.01); *G02B 1/105* (2013.01); *Y10T 428/105* (2015.01); *Y10T 428/31971* (2015.04)

(58) Field of Classification Search
CPC ........ C08K 5/3435; G02B 1/105; G02B 1/14; C08L 1/10; Y10T 428/105; Y10T 428/1077
USPC ............. 428/1.3–1.33, 1.5, 1.54; 349/96, 122
See application file for complete search history.

(56) References Cited

U.S. PATENT DOCUMENTS 3,528,833 A * 9/1970 Taskier ....................... 106/162.7
2004/0059106 A1* 3/2004 Yamada et al. ................ 536/56

(Continued)

FOREIGN PATENT DOCUMENTS

JP 2001-072782 A 3/2001
JP 2002-264153 A 9/2002

(Continued)

OTHER PUBLICATIONS

Official Action issued by the Japanese Office Action on Oct. 7, 2014, in connection with Japanese Patent Application No. 2011-179705.

(Continued)

*Primary Examiner* — Sophie Hon
(74) *Attorney, Agent, or Firm* — Jean C. Edwards, Esq.; Edwards Neils PLLC

(57) ABSTRACT

A polarizer protective film having a cellulose acylate film containing a cellulose acylate and a hindered amine compound in an amount of at least 0.01% by mass relative to the cellulose acylate, and, as laminated on the cellulose acylate film, an active energy ray-curable layer, wherein the hindered amine compound has a piperidine skeleton represented by the following formula (1):

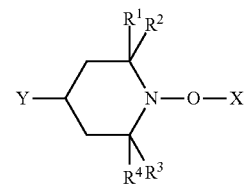

Formula (1)

wherein X represents an alkyl or aryl group; Y represents a hydrogen atom or a substituent; $R^1$ to $R^4$ represent an alkyl group.

7 Claims, 1 Drawing Sheet

(56) References Cited

U.S. PATENT DOCUMENTS

| | | | |
|---|---|---|---|
| 2005/0045064 A1* | 3/2005 | Oya | 106/170.27 |
| 2008/0118667 A1* | 5/2008 | Kasahara et al. | 428/1.1 |
| 2009/0226641 A1* | 9/2009 | Nakamura et al. | 428/1.33 |
| 2010/0036075 A1* | 2/2010 | Ishino et al. | 526/320 |

FOREIGN PATENT DOCUMENTS

| | | |
|---|---|---|
| JP | 2003-094573 A | 4/2003 |
| JP | 2003-170447 A | 6/2003 |
| JP | 2006-104374 | 4/2006 |
| JP | 2007-084608 A | 4/2007 |
| JP | 2007-264281 A | 10/2007 |
| JP | 2009-167416 | 7/2009 |

OTHER PUBLICATIONS

Official Action issued by the Japanese Patent Office on Sep. 25, 2015, in connection with corresponding Japanese Patent Application No. 2014-241419.

* cited by examiner

POLARIZER PROTECTIVE FILM, POLARIZER, AND LIQUID CRYSTAL DISPLAY DEVICE

CROSS-REFERENCE TO RELATED APPLICATIONS

The present application claims the benefit of priority from Japanese Patent Application No. 2010-227417, filed on Oct. 7, 2010 and Japanese Patent Application No. 2011-179705, filed on Aug. 19, 2011, the contents of which are herein incorporated by reference in their entirety.

BACKGROUND OF THE INVENTION

1. Field of the Invention

The present invention relates to a polarizer protective film, and a polarizer and a liquid crystal display device using the polarizer protective film.

2. Description of the Related Art

With the recent tendency toward advanced upsizing of liquid crystal display devices typically for use for televisions, much desired are high-quality picture technology and price reduction. In future, outdoor-use frequency of display devices typically for digital signage and others is expected to increase more and more, and liquid crystal display devices capable of withstanding use under more extreme weather condition than before are desired.

On the other hand, the polarizer surface on the viewers' side is desired to have various functions of scratch resistance, antireflection, static charge prevention, etc. For making the surface have such functions, generally employed is a method of forming an active energy ray-curable layer on a cellulose acylate film or the like to produce a functional layer-having polarizer-protective film.

The polarizer in a liquid crystal display device that is widely used in the art is so designed that a polarizing element formed by using polyvinyl alcohol (PVA) and iodine is sandwiched between polarizer protective films such as cellulose acylate films, etc. However, the polarizing element formed by using PVA and iodine has a weakness in that the polarizability thereof tends to worsen in high-temperature high-humidity environments; and therefore, the polarizing element of the type must be improved to satisfy the required performance for outdoor use.

For outdoor use, the above-mentioned functional layers are also required to satisfy further severer durability as compared with those for indoor use. Above all, stability to light is an especially important matter; however, ordinary functional layers have a problem in that, when exposed to light for a long period of time, the active energy ray-curable layer therein may be readily peeled from the cellulose acylate film, and improving them is desired.

For improving the lightfastness of resin films, generally employed is a method of adding a UV absorbent or an antioxidant thereto; and for example, Patent Reference 1 discloses a resin film with a triazine-type UV absorbent and a hindered amine-type antioxidant added thereto. Patent Reference 2 discloses a method for forming an active energy ray-curable layer such as a hard coat layer or the like, on a cellulose acylate film containing a hindered amine-type antioxidant.

CITATION LIST

Patent References

[Patent Reference 1] JP-A 2009-167416
[Patent Reference 2] JP-A 2006-104374

SUMMARY OF THE INVENTION

The present inventors investigated the methods described in Patent References 1 and 2, and have known that the films obtained according to these methods have various problems in that the adhesiveness between the functional layer and the cellulose acylate film therein is insufficient when exposed to light for a long period of time, and in addition, the addition of the hindered amine compound extremely worsens the capability of polarizing elements in long-term use in high-temperature high-humidity environments.

The present invention has been made in consideration of the situation as above, and one object of the invention is to provide a polarizer protective film which, even when exposed to light for a long period of time, can fully sustain the adhesiveness between the active energy ray-curable layer and the cellulose acylate film therein even when exposed to light for a long period of time, and can still sustain good polarizability when incorporated in a polarizer and even when used in high-temperature high-humidity environments for a long period of time. Another object of the invention is to provide a polarizer and a liquid crystal display device using the polarizer protective film.

Heretofore, it has been considered that, for the adhesiveness between the active energy ray-curable layer and the cellulose acylate film, the affinity of the surface of the active energy ray-curable layer for the cellulose acylate film and/or the degree of crosslinking in the active energy ray-curable layer would be important factors. However, the present inventors have assiduously investigated the matters and, as a result, have found that the peeling between the active energy ray-curable layer and the cellulose acylate film may be caused by the brittle fracture in the surface layer of the cellulose acylate. Further, the inventors have found that the brittle fracture is extremely promoted by the radical generated in photoreaction of the additive in the active energy ray-curable layer or the cellulose acylate film, or that is, the radical causes depolymerization of the resin (cellulose acylate) in the cellulose acylate film and/or the resin constituting the active energy ray-curable layer.

The method of adding a UV absorbent and an antioxidant to a cellulose acylate film, as in Patent Reference 1, is intended to inhibit the radical generation caused by photoabsorption of the material in the cellulose acylate film, and the method is poorly effective for preventing the radical generation in an active energy ray-curable layer. As opposed to this, the present invention is to prevent not only the radical generation caused by the photoabsorption of the material in the cellulose acylate film but also the radical generation caused by the active energy ray-curable functional layer. Specifically, the present inventors selected a hindered amine compound having a specific structure and added the compound to a cellulose acylate film as an antioxidant therein, and have found that the antioxidant (hindered amine compound having a specific structure) in the cellulose acylate film can be diffused in the active energy ray-curable functional layer and the active radicals (peroxide radical, hydroxy radical, etc.) generated in the active energy ray-curable functional layer can be effectively inactivated.

Further, the present inventors have found that the advanced drying on the support in producing the cellulose acylate film according to a solution casting method has a great influence on the peeling between the cellulose acylate film coated with an active energy ray-curable functional layer, and the active energy ray-curable functional layer. Specifically, the inventors have found that when a coating liquid (dope) prepared by dissolving a cellulose acylate in a solvent having a higher solubility for it is used, a cellulose acylate film having a high surface strength can be formed and the film is free from the trouble of brittle fracture mentioned above, or that is, the film is free from the trouble of interlayer peeling between the cellulose acylate film and the active energy ray-curable functional layer. In addition, the inventors have also found that, in case where a good solvent for cellulose acylate, methylene chloride is combined with an alcoholic solvent having the effect of cutting the hydrogen bonding between cellulose acylate molecular chains and having a higher boiling point than methylene chloride, and when the active energy ray-curable layer is formed on the side of the cellulose film that was not kept in contact with the support (hereinafter this is referred to as air-facing side), then the peeling between the cellulose acylate film and the active energy ray-curable functional layer hardly occurs. It may be presumed that the air-facing side of the film, in which the concentration of the good solvent, methylene chloride is kept high, would be dried as such, and therefore a cellulose acylate film having a high surface strength could be obtained.

In addition, the inventors have found that the radical inactivating effect of the hindered amine compound heretofore used as an additive to optical films, as disclosed in Patent Reference 2, lowers since the proportion of the proton adduct increases in a case where the pH level in the polarizer protective film is from neutral to weakly acidic. On the other hand, the inventors have further found that, in a case where the pH level in the polarizer protective film is alkaline, the existing hindered amine compound extremely degrades the polarizing element capability in long-term use in high-temperature high-humidity environments.

Against the newly-occurred problems, the present inventors have found that, when a hindered amine compound having a specific structure represented by the following formula (1) is used, then the adhesiveness between the active energy ray-curable layer and the cellulose acylate film is bettered and the polarizing element capability worsens little in long-term use in high-temperature high-humidity environments, irrespective of the pH level in the polarizer protective film.

Specifically, the present invention involves the following constitution.

[1] A polarizer protective film having a cellulose acylate film containing a cellulose acylate and a hindered amine compound in an amount of at least 0.01% by mass relative to the cellulose acylate, and, as laminated on the cellulose acylate film, an active energy ray-curable layer, wherein the hindered amine compound has a piperidine skeleton represented by the following formula (1):

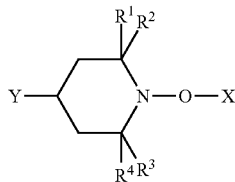

Formula (1)

wherein X represents an alkyl or aryl group optionally having a substituent; Y represents a hydrogen atom or a substituent; $R^1$ to $R^4$ each independently represent an alkyl group.

[2] The polarizer protective film of [1], wherein the cellulose acylate film contains the hindered amine compound in an amount of at most 15% by mass relative to the cellulose acylate.

[3] The polarizer protective film of [1] or [2], wherein the hindered amine compound is represented by the following formula (2) or (3):

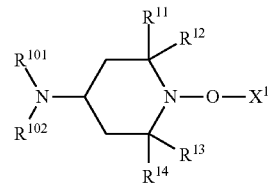

Formula (2)

wherein $X^1$ represents an alkyl or aryl group optionally having a substituent; $R^{11}$ to $R^{14}$ each independently represent an alkyl group; $R^{101}$ represents a hydrogen atom, an alkyl group, an aryl group or a heterocyclic group; $R^{102}$ represents an alkyl group, an aryl group or a heterocyclic group,

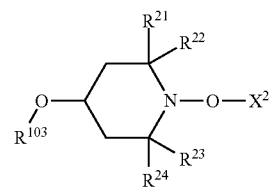

Formula (3)

wherein $X^2$ represents an alkyl or aryl group optionally having a substituent; $R^{21}$ to $R^{24}$ each independently represent an alkyl group; $R^{103}$ represents a hydrogen atom, an alkyl group, an acyl group or an aryl group.

[4] The polarizer protective film of [1] or [2], wherein the hindered amine compound is represented by the following formula (4) or (5):

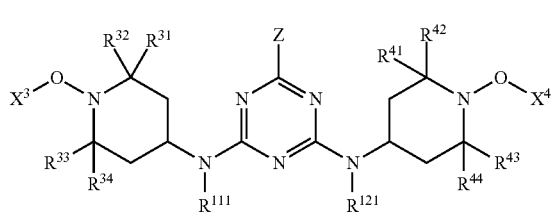

Formula (4)

wherein $X^3$ and $X^4$ each independently represents an alkyl or aryl group optionally having a substituent; $R^{31}$ to $R^{34}$ and $R^{41}$ to $R^{44}$ each independently represent an alkyl group; $R^{111}$ and $R^{121}$ each independently represent a hydrogen atom, an alkyl group, an aryl group or a heterocyclic group; Z represents a monovalent substituent, Formula (5)

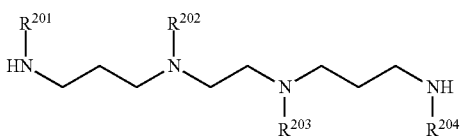

wherein $R^{201}$ to $R^{204}$ each independently represent a hydrogen atom or a substituent represented by the following formula (P), and at least one of $R^{201}$ to $R^{204}$ is the substituent represented by the following formula (P):

Formula (P)

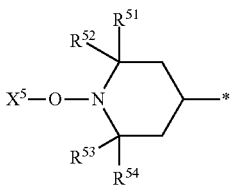

wherein $X^5$ represents an alkyl or aryl group optionally having a substituent; $R^{51}$ to $R^{54}$ each independently represent an alkyl group; * represents a linking position.

[5] The polarizer protective film of any one of [1] to [4], wherein the cellulose acylate film contains an organic acid.

[6] The polarizer protective film of [5], wherein the organic acid is represented by the following formula (9):

$$X^{11}\text{-}L^{11}\text{-}(R^{401})_n \qquad (9)$$

wherein $X^{11}$ represents an acid group having an acid dissociation constant of at most 7.0; $L^{11}$ represents a single bond or a linking group having a valence of at least two; $R^{401}$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a heterocyclic group having from 6 to 30 carbon atoms, which may optionally have a substituent; n is 1 when $L^{11}$ is a single bond, and is the valence of the linking group represented by $L^{11}$ minus 1 when $L^{11}$ is a linking group having a valence of at least two.

[7] The polarizer protective film of [5], wherein the organic acid is one having an acid dissociation constant of from 2 to 7 in a mixed solvent of tetrahydrofuran/water=6/4 by volume at 25° C.

[8] The polarizer protective film of any one of [1] to [7], wherein the cellulose acylate film has a core layer and, as laminated on the surface of the core layer, one or more skin layers, and of the skin layers, one adjacent to the active energy ray-curable layer contains the hindered amine compound.

[9] The polarizer protective film of any one of [1] to [8], wherein the hindered amine compound is contained also in the active energy ray-curable layer.

[10] The polarizer protective film of any one of [1] to [9], wherein the hindered amine compound dissolves in a ketone solvent in an amount of at least 0.01% by mass.

[11] The polarizer protective film of any one of [1] to [10], wherein the cellulose acylate film is formed by casting a dope, which is prepared by dissolving a cellulose acylate in a solvent having a composition of methylene chloride/alcohol in a ratio by mass of from 94/6 to 60/40, onto a support.

[12] The polarizer protective film of any one of [1] to [11], wherein the active energy ray-curable layer is formed by coating on the side of the cellulose acylate film that is opposite to the side thereof kept in contact with the support during film formation.

[13] The polarizer protective film of any one of [1] to [12], wherein the cellulose acylate film contains a polarizer.

[14] The polarizer protective film of [13], wherein the active energy ray-curable layer is formed by coating on the surface of the cellulose acylate film in which the plasticizer concentration in the cellulose acylate is lower.

[15] A polarizer containing a polarizing element and at least one polarizer protective film of any one of [1] to [14].

[16] A liquid crystal display device containing at least one of the polarizer protective film of any one of [1] to [14] or the polarizer of [15].

According to the invention, there is obtained a polarizer protective film comprising an active energy-curable layer and a cellulose acylate film, in which the adhesiveness between the layer and the film is fully kept even in long-term exposure to light. When incorporated in a polarizer and even when used for a long period of time in high-temperature high-humidity environments, the polarizer protective film can still maintain good polarizability. According to the invention, there is also provided a highly-durable polarizer comprising the film. When the polarizer comprising the film is incorporated in a liquid crystal display device, there is provided a liquid crystal display device having enhanced durability.

Figure 1:
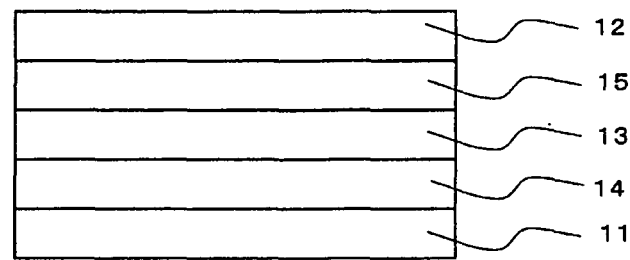
FIG. 1 is a schematic cross-sectional view of one example of the liquid crystal display device of the invention.

In the drawings, 1 is surface layer dope, 2 is core layer dope, 3 is co-casting giesser, 4 is casting support, is polarizing element, 12 is polarizing element, 13 liquid crystal cell, 14 is cellulose acylate film of Examples and Comparative Examples, and 15 is cellulose acylate film of Examples and Comparative Examples.

BEST MODE FOR CARRYING OUT THE INVENTION

The polarizer protective film of the invention and its production method, and additives to be used for the film are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Polarizer Protective Film]

The polarizer protective film of the invention has a cellulose acylate film containing a cellulose acylate and a hindered amine compound in an amount of at least 0.01% by mass relative to the cellulose acylate, and, as laminated on the cellulose acylate film, an active energy ray-curable layer, wherein the hindered amine compound has a piperidine skeleton represented by the following formula (1):

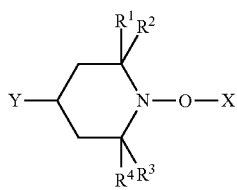

Formula (1)

wherein X represents an alkyl or aryl group optionally having a substituent; Y represents a hydrogen atom or a substituent; $R^1$ to $R^4$ each independently represent an alkyl group.

First described is the cellulose acylate film that the polarizer protective film of the invention has.

1. Cellulose Acylate Film:

The cellulose acylate film for use in the polarizer protective film of the invention contains a cellulose acylate and a hindered amine compound in an amount of at least 0.01% by mass relative to the cellulose acylate, wherein the hindered amine compound has a piperidine skeleton represented by the above-mentioned formula (1).

The cellulose acylate film for use in the invention is described below.

<1-1: Cellulose Acylate>

The starting material cellulose for the cellulose acylate for use in the cellulose acylate film includes cotton linter and wood pulp (hardwood pulp, softwood pulp), etc.; and any cellulose acylate obtained from any starting cellulose can be used herein. As the case may be, different starting celluloses may be mixed for use herein. The starting cellulose materials are described in detail, for example, in Marusawa & Uda's "Plastic Material Lecture (17), Cellulosic Resin" (by Nikkan Kogyo Shinbun, 1970), and in Hatsumei Kyokai Disclosure Bulletin No. 2001-1745, pp. 7-8. Cellulose materials described in these may be used here.

One type alone of acyl group may be in the cellulose acylate to be used in the cellulose acylate film; or two or more different types of acyl groups may be used therein. The cellulose acylate for use in the cellulose acylate film preferably has an acyl group having from 2 to 4 carbon atoms as the substituent therein. In case where the cellulose acylate has two or more different types of acyl groups, preferably, one of them is an acetyl group, and the acyl group having from 2 to 4 carbon atoms is preferably a propionyl group or a butyryl group. The cellulose acylate of the type can form a solution having good solubility, and in particular, can form a good solution in a non-chlorine organic solvent. In addition, the cellulose acylate of the type can form a solution having a low viscosity and having good filterability.

First described is the cellulose acylate preferred for use in the invention is described. The β-1,4-bonding glucose unit to constitute cellulose has a hydroxyl group at the 2-, 3- and 6-positions. The cellulose acylate is a polymer produced by esterifying a part or all of those hydroxyl groups in cellulose with an acyl group. The degree of acyl substitution means the total of the ratio of esterification of the hydroxyl groups in cellulose positioned in the 2-, 3- and 6-positions (the degree of 100% acyl substitution in each position is 1).

Preferably, the total degree of acyl substitution of the cellulose acylate is from 2.0 to 2.97, more preferably from 2.5 to less than 2.97, even more preferably from 2.70 to 2.95.

The acyl group having 2 or more carbon atoms in the cellulose acylate may be an aliphatic group or an aryl group with no specific limitation thereon. For example, it includes cellulose alkylcarbonyl esters, alkenylcarbonyl esters, aromatic carbonyl esters, aromatic alkylcarbonyl esters, etc., and these may have a substituent group. As their preferred, there may be mentioned an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group, a cinnamoyl group, etc. Of those, preferred are an acetyl group, a propionyl group, a butanoyl group, a dodecanoyl group, an octadecanoyl group, a tert-butanoyl group, an oleoyl group, a benzoyl group, a naphthylcarbonyl group, a cinnamoyl group, etc.; more preferred are an acetyl group, a propionyl group and a butanoyl group (acyl groups each having from 2 to 4 carbon atoms); and even more preferred is an acetyl group (the cellulose acylate is cellulose acetate).

In case where an acid hydride or an acid chloride is used as the acylating agent for acylation of cellulose, the reaction solvent of an organic solvent to be used includes an organic acid, for example, acetic acid, methylene chloride, etc.

In case where the acylating agent is an acid anhydride, the catalyst to be used is preferably a protic catalyst such as sulfuric acid; and in case where the acylating agent is an acid chloride (for example, $CH_3CH_2COCl$), a basic compound is preferably used.

A most general method for industrial production of mixed fatty acid esters of cellulose comprises acylating cellulose with a mixed organic acid component containing a fatty acid corresponding to an acetyl group or any other acyl group (acetic acid, propionic acid, valeric acid, etc.), or an acid anhydride thereof.

The cellulose acylate for use in the invention can be produced, for example, according to the method described in JP-A 10-45804.

The cellulose acylate film preferably contains the cellulose acylate as the resin in an amount of from 5 to 99% by mass, from the viewpoint of the moisture permeability of the film, more preferably in an amount of from 20 to 99% by mass, even more preferably from 50 to 95% by mass.

<1-2: Hindered Amine Compound>

The cellulose acylate film for use in the polarizer protective film of the invention is characterized by containing a hindered amine compound represented by the following formula (1) in an amount of at least 0.01% by mass. Since the cellulose acylate film in the polarizer protective film contains the hindered amine compound having a specific piperidine skeleton, there can be obtained a polarizer protective film which is excellent in the adhesiveness between the active energy ray-curable resin layer formed on the cellulose acylate film, and the cellulose acylate film, and which does not worsen the polarizability of polarizer even in long-term use in high-temperature high-humidity environments.

First described in detail is the hindered amine compound represented by the following formula (1):

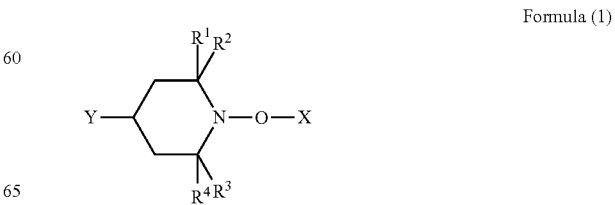

Formula (1)

In the formula (1), X represents an alkyl or aryl group optionally having a substituent; Y represents a hydrogen atom or a substituent; $R^1$ to $R^4$ each independently represent an alkyl group.

Preferably, X is an alkyl group, more preferably an alkyl group having a branched structure, an alkyl group having a cyclic structure, or an alkyl group having an aryl group as the substituent, even more preferably a cyclic alkyl group, still more preferably a cyclohexyl group. The substituent that X may have is not specifically defined.

Y is preferably a substituent. Not specifically defined, the substituent represented by Y is preferably a substituent bonding to the piperidine ring via the nitrogen atom or the oxygen atom thereof, more preferably an amino group, a hydroxyl group, an alkoxy group, an aryloxy group or an acyloxy group that may optionally have a substituent, even more preferably an amino group, a hydroxyl group, an alkoxy group or an acyloxy group having an alkyl group, an aryl group or a heterocyclic group as the substituent.

Preferably, $R^1$ to $R^4$ each independently represent an alkyl group having from 1 to 6 carbon atoms, more preferably an ethyl group or a methyl group. Even more preferably, these are all methyl groups.

The hindered amine compound is characterized in that the nitrogen (N) of the piperidine ring bonds to the alkyl or aryl group optionally having a substituent represented by X, in a mode of ether bonding. The hindered amine compound having the piperidine skeleton of the above-mentioned formula (1), which contains the structure "N—O—X", is referred to as "$NOR^1$ type" in this description.

Others, or that is, a hindered amine compound in which hydrogen alone directly bonds to the nitrogen (N) of the piperidine ring (comparative case) is referred to as "NH type", and a hindered amine compound in which a methyl group alone directly bonds to the nitrogen (N) (comparative case) is referred to as "$NCH_3$ type". The NH type and the $NCH_3$ type both have stronger basicity as compared with the $NOR^1$ type. Not adhering to any theory, use of the $NOR^1$ type hindered amine compound having weaker basicity in the present invention makes it possible to prevent the deterioration of the polarizing element capability when the polarizer protective film of the invention is incorporated in a polarizer and when the polarizer is used for a long period of time in high-temperature high-humidity environments.

The $NOR^1$ type hindered amine compound represented by the formula (1) is not specifically defined so far as the compound has the specific piperidine skeleton. More concretely, the compound is preferably one represented by the following formula (2) or formula (3):

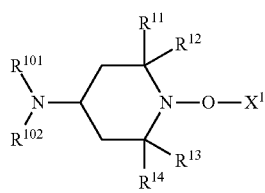

Formula (2)

In the formula (2), $X^1$ represents an alkyl or aryl group optionally having a substituent; $R^{11}$ to $R^{14}$ each independently represent an alkyl group; $R^{101}$ represents a hydrogen atom, an alkyl group, an aryl group or a heterocyclic group; $R^{102}$ represents an alkyl group, an aryl group or a heterocyclic group.

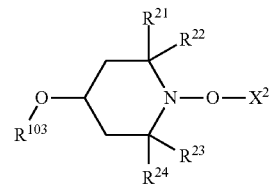

Formula (3)

In the formula (3), $X^2$ represents an alkyl or aryl group optionally having a substituent; $R^{21}$ to $R^{24}$ each independently represent an alkyl group; $R^{103}$ represents a hydrogen atom, an alkyl group, an acyl group or an aryl group.

The preferred range of $R^{11}$ to $R^{14}$ and $R^{21}$ to $R^{24}$ each is the same as that of $R^1$ to $R^4$. The preferred range of $X^1$ and $X^2$ is the same as that of X.

Preferably, $R^{101}$ is a hydrogen atom or an alkyl group, more preferably a hydrogen atom or an alkyl group having from 1 to 6 carbon atoms, even more preferably a propyl group or a butyl group.

Preferably, $R^{102}$ is an alkyl group or a heterocyclic group, more preferably an alkyl group having from 1 to 6 carbon atoms or a mono or di-cyclic heterocyclic group containing a nitrogen atom, even more preferably triazine.

Preferably, $R^{103}$ is a hydrogen atom, an alkyl group having from 1 to 12 carbon atoms, an acyl group having from 1 to 12 carbon atoms, or an aminoacyl group having from 1 to 12 carbon atoms, more preferably an acyl group having from 1 to 12 carbon atoms.

In the above-mentioned formulae (2) and (3), the substituent represented by $R^{101}$ to $R^{103}$ may further have a substituent, for example, may have a substituent derived from the formula (1) by removing the substituent Y therefrom.

Compounds of the above-mentioned formulae (2) and (3) where the substituent represented by $R^{101}$ to $R^{103}$ further has a substituent derived from the formula (1) by removing the substituent Y therefrom include, for example, those represented by the following formulae (4) to (6):

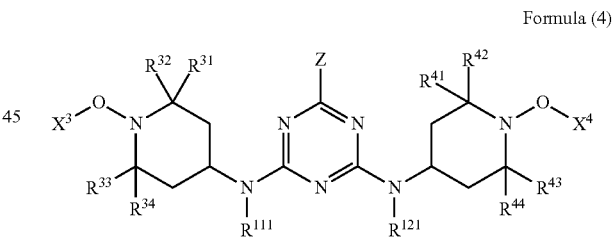

Formula (4)

In the formula (4), $X^3$ and $X^4$ each independently represent an alkyl or aryl group optionally having a substituent; $R^{31}$ to $R^{34}$ and $R^{41}$ to $R^{44}$ each independently represent an alkyl group; $R^{111}$ and $R^{121}$ each independently represent a hydrogen atom, an alkyl group, an aryl group or a heterocyclic group; Z represents a monovalent substituent.

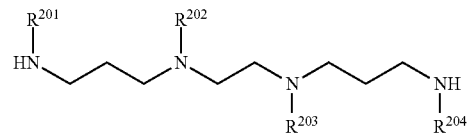

Formula (5)

In the formula (5), $R^{201}$ to $R^{204}$ each independently represent a hydrogen atom or a substituent represented by the following formula (P), and at least one of $R^{201}$ to $R^{204}$ is the substituent represented by the formula (P):

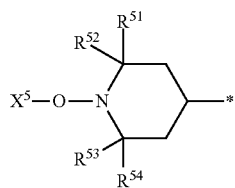

Formula (P)

In the formula (P), $X^5$ represents an alkyl or aryl group optionally having a substituent; $R^{51}$ to $R^{54}$ each independently represent an alkyl group; * represents a linking position.

The preferred range of $R^{31}$ to $R^{34}$, $R^{41}$ to $R^{44}$ and $R^{51}$ to $R^{54}$ is the same as that of $R^1$ to $R^4$. The preferred range of $X^3$ to $X^5$ is the same as that of X.

More preferably, at least two to four of $R^{201}$ to $R^{204}$ each are the substituent represented by the formula (P), even more preferably three of them each are the substituent represented by the formula (P).

Preferred examples of the hindered amine compound represented by the formula (1) are shown below, to which, however, the invention should not be limited.

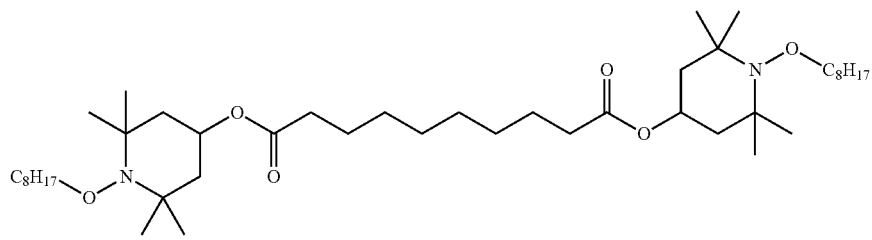

A-1

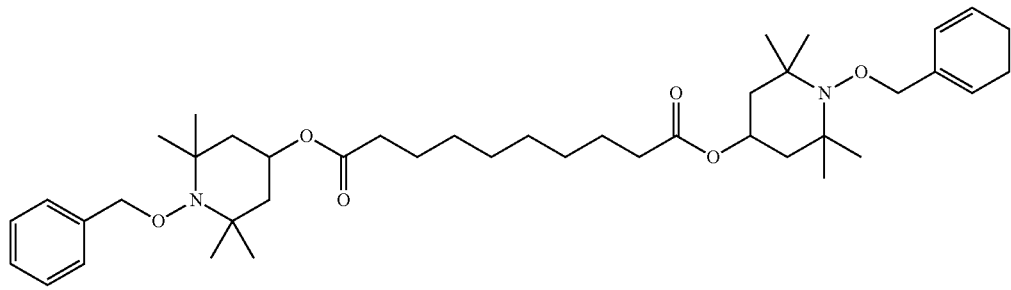

A-2

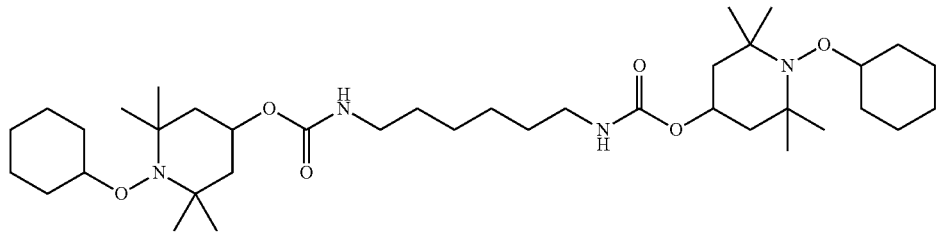

A-3

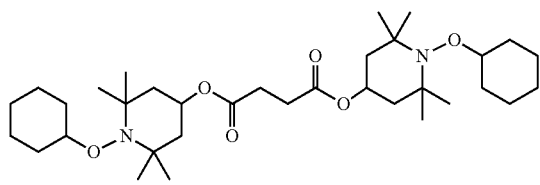

A-4

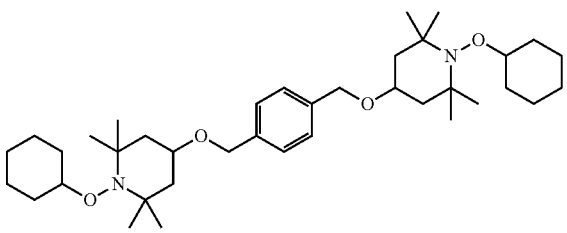

A-5

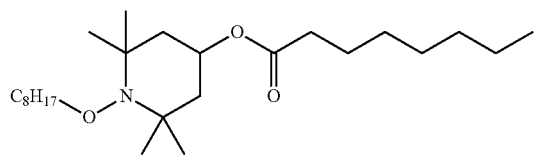

A-6

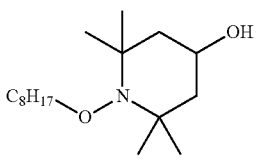

A-7

-continued

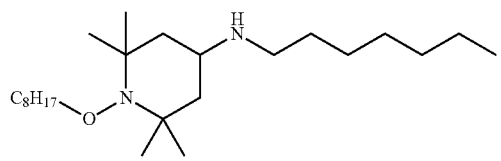
A-8

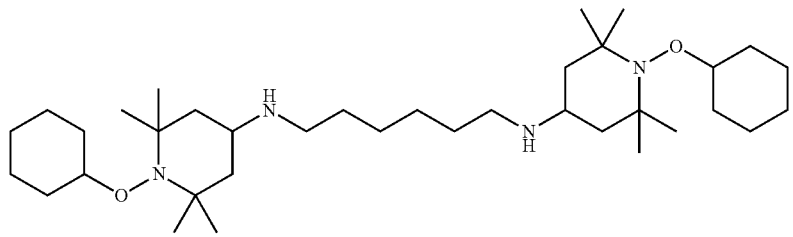
A-9

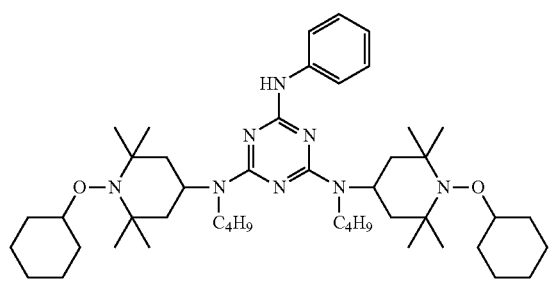
A-10

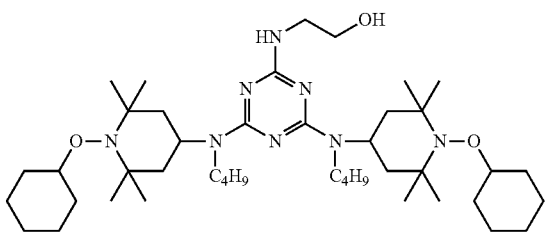
A-11

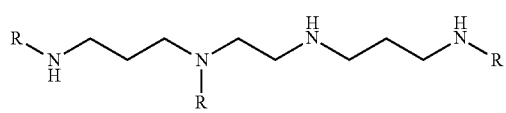
A-12

R =

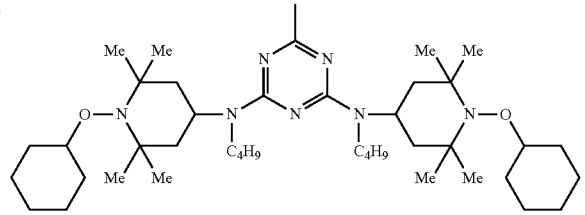

Of the above-mentioned examples, compound A-11 (trade name, "TINUVIN 152", produced by Ciba Specialty Chemicals, CAS-No. 191743-75-6) and compound A-12 (trade name, "FLAMESTAB NOR 116 FF", produced by Specialty Chemicals, CAS-No. 191680-81-6) are more preferred, since they are sold on the market and are readily available.

In addition, the following compound A-13 (trade name, "TINUVIN 123", produced by Ciba Specialty Chemicals, CAS-No. 129757-67-1) is also preferred for use herein.

The hindered amine compound for use herein may be commercially available or as above, or may be one produced through synthesis. The production method of the hindered amine compound is not specifically defined, and the compound can be produced through ordinary organic synthesis. In the production method, suitably employed is any means of distillation, recrystallization, reprecipitation, use of filtering agent, absorbent, etc. Further, in general, those that are sold on the market and available inexpensively are often not in the

A-13

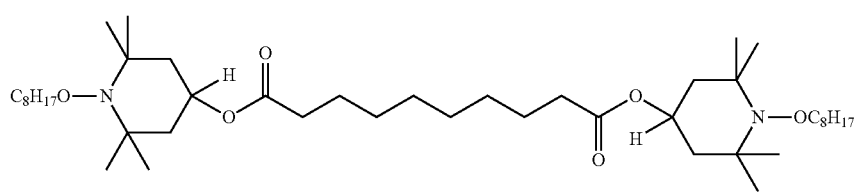

form of the hindered amine compound alone but are in the form of a mixture thereof; however, in the present invention, any one obtained commercially is usable irrespective of the production method, the composition, the melting point, the acid value and the like thereof.

The hindered amine compound for use in the invention may be a low-molecular compound or may be a polymer having a recurring unit.

Preferably, the hindered amine compound has a molecular weight of from 300 to 30000, more preferably from 500 to 15000, even more preferably from 700 to 10000.

The hindered amine compound for use in the invention is preferably one capable of dissolving in a ketone solvent in an amount of at least 0.01% by mass. Use of the hindered amine compound of the type herein is preferred, since the hindered amine compound added to the cellulose acylate film in producing the polarizer protective film of the invention can dissolve in the ketone solvent favorably used in forming the active energy ray-curable layer to be described below, and may move thereinto, and finally the hindered amine compound can be contained in the active energy ray-curable layer.

Preferred embodiments of the ketone solvent are described in the section of the active energy ray-curable layer to be given hereinunder.

The cellulose acylate film contains the (NOR$^1$ type) hindered amine compound represented by the formula (1), in an amount of at least 0.01% by mass. Preferably, the amount of the hindered amine compound of the formula (1) in the film is at most 15% by mass relative to the cellulose acylate, more preferably from 0.1 to 12% by mass, even more preferably from 0.3 to 12% by mass.

When the content of the (NOR$^1$ type) hindered amine compound of the formula (1) in the cellulose acylate film is less than 0.01% by mass relative to the cellulose acylate, then the adhesiveness between the active energy ray-curable functional layer and the cellulose acylate film could not be fully secured. When the content is at most 15% by mass, then the hindered amine compound hardly bleeds out, which is favorable from the viewpoint of enhancing the polarizability of polarizer.

<1-3: Organic Acid>

Preferably, the cellulose acylate film in the polarizer protective film of the invention contains an organic acid.

Preferably, the organic acid is at least one of an organic acid having an acid dissociation constant of from 2 to 7 in a mixed solvent of tetrahydrofuran/water=6/4 by volume at 25° C. (hereinafter this may be referred to as an organic acid having a specific acid dissociation constant), or an organic acid represented by the following formula (9). The organic acid is effective for lowering the pH level of polarizing element in high-temperature high-humidity environments and therefore preventing the deterioration of the polarizing element capability.

(Organic Acid Having a Specific Acid Dissociation Constant)

Of the above-mentioned organic acids, the organic acid having an acid dissociation constant of from 2 to 7 in a mixed solvent of THF/water=6/4 by volume at 25° C. is described below. More preferably, the acid dissociation constant of the organic acid in a mixed solvent of THF/water=6/4 by volume is from 2.5 to 7, even more preferably from 2.5 to 6.5, still more preferably from 3 to 5.

For measurement of the acid dissociation constant in the invention, employed is the alkali titration method described in Experimental Chemistry Course, 2nd Ed., pp. 215-217 (published by Maruzen).

Preferably, the molecular weight of the organic acid having a specific acid dissociation constant is from 200 to 1000, more preferably from 250 to 800, even more preferably from 280 to 700. The molecular weight not lower than the lowermost limit of the above-mentioned range is preferred since the polarizing element durability in high-temperature low-humidity environments can be enhanced; and the molecular weight not higher than the uppermost limit of the above-mentioned range is preferred since the polarizing element durability in high-temperature high-humidity environments can be enhanced.

As the organic acid having a specific acid dissociation constant, preferred for use herein are compounds represented by the following formulae (6) to (8).

Preferred structures of the organic acids of the formulae (6) to (8) are described sequentially hereinunder.

Organic Acid of Formula (6):

The organic acid having a specific acid dissociation constant is preferably represented by the following formula (6):

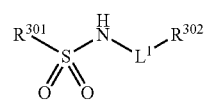

Formula (6)

In the formula (6), $R^{301}$ and $R^{302}$ each independently represent a hydrogen atom, an alkyl group or an aryl group. $R^{301}$ and $R^{302}$ each may have a substituent, or may bond to each other to form a ring. $L^1$ represents —SO$_2$— or —CO—.

Preferably, $R^{301}$ is an aryl group having from 6 to 18 carbon atoms, more preferably an aryl group having from 6 to 12 carbon atoms, even more preferably a phenyl group.

Preferably, $R^{302}$ is an alkyl group having from 1 to 12 carbon atoms or an aryl group having from 6 to 12 carbon atoms, more preferably a methyl group or an aryl group having from 6 to 12 carbon atoms, even more preferably a phenyl group.

The substituent that $R^{301}$ and $R^{302}$ may have is not specifically defined, not contradictory to the scope and the sprit of the invention, but is preferably a halogen atom or an alkyl group, more preferably a halogen atom or an alkyl group having from 1 to 6 carbon atoms, even more preferably a chlorine atom or a methyl group.

The ring that may be formed by $R^{301}$ and $R^{302}$ bonding to each other is preferably an aromatic ring structure, and the aromatic ring structure is preferably an aryl group having from 6 to 12 carbon atoms, more preferably a phenyl group.

$L^1$ is preferably —SO$_2$— or —CO—.

A specific example of the organic acid represented by the formula (6) is shown below, to which, however, the invention should not be limited.

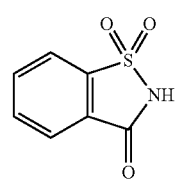

(6-1)

Organic Acid of Formula (7):

The organic acid having a specific acid dissociation constant is preferably represented by the following formula (7):

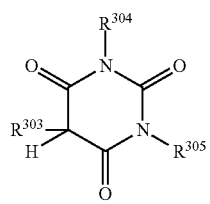

Formula (7)

In the formula (7), $R^{303}$ represents an aryl group; $R^{304}$ and $R^{305}$ each independently represent a hydrogen atom, an alkyl group, or an aryl group. $R^{304}$ and $R^{305}$ each may have a substituent.

Preferably, $R^{303}$ is an aryl group having from 6 to 18 carbon atoms, more preferably an aryl group having from 6 to 12 carbon atoms, even more preferably a phenyl group.

Preferably, $R^{304}$ and $R^{305}$ each independently represent a hydrogen atom, an alkyl group having from 1 to 12 carbon atoms (including a cycloalkyl group), or an aryl group having from 6 to 12 carbon atoms, more preferably a hydrogen atom, an alkyl group having from 1 to 6 carbon atoms (including a cycloalkyl group), or a phenyl group, even more preferably a hydrogen atom, a methyl group, an ethyl group, a cyclohexyl group or a phenyl group.

The substituent that $R^{303}$ may have is not specifically defined, not contradictory to the scope and the sprit of the invention, but is preferably a halogen atom or an alkyl group, more preferably a halogen atom or an alkyl group having from 1 to 6 carbon atoms, even more preferably a chlorine atom or a methyl group.

The substituent that $R^{304}$ and $R^{305}$ may have is not specifically defined, not contradictory to the scope and the sprit of the invention, but is preferably an aryl group having from 6 to 12 carbon atoms, more preferably a phenyl group.

Specific examples of the organic acid represented by the formula (7) are shown below, to which, however, the invention should not be limited.

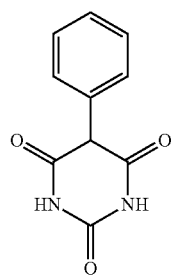

(7-1)

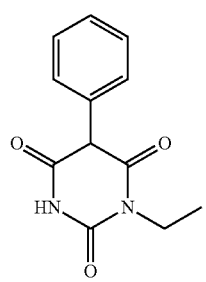

(7-2)

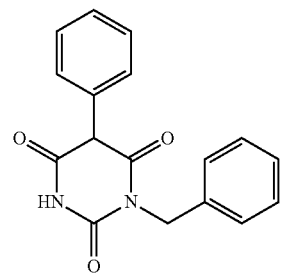

(7-3)

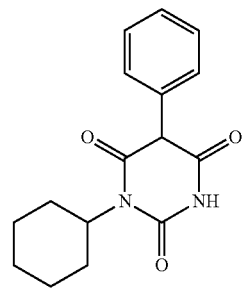

(7-4)

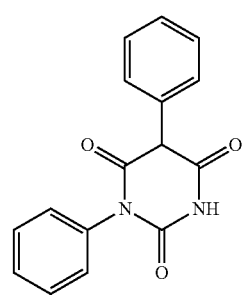

(7-5)

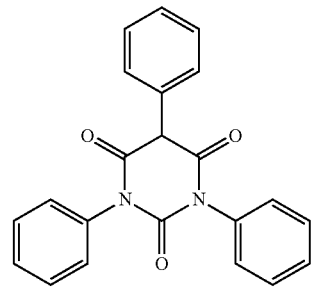

(7-6)

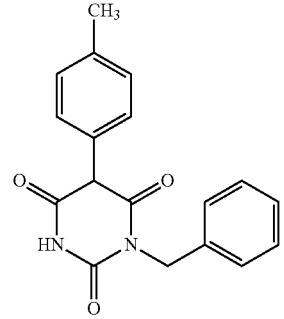

(7-7)

(7-8)

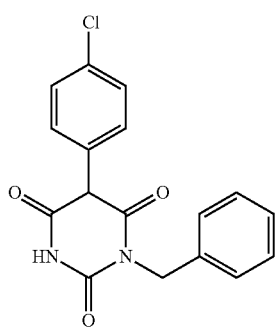

(7-9)

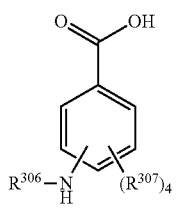

Organic Acid of Formula (8):

The organic acid having a specific acid dissociation constant is preferably represented by the following formula (8):

Formula (8)

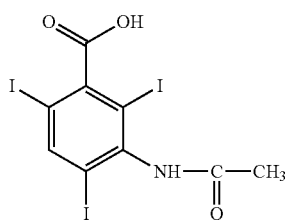

In the formula (8), $R^{306}$ represents a hydrogen atom, an acyl group or a sulfonyl group; $R^{307}$ each independently represents a hydrogen atom or a halogen atom. $R^{306}$ may have a substituent.

$R^{306}$ is preferably a hydrogen atom or an acyl group, more preferably a hydrogen atom or an acyl group having from 2 to 5 carbon atoms.

Preferably, $R^{307}$ each independently represents a hydrogen atom, a fluorine atom or an iodine atom, and plural $R^{307}$'s may be the same or different.

The substituent that $R^{307}$ may have is not specifically defined, not contradictory to the scope and the sprit of the invention, but is preferably an aryl group, more preferably a phenyl group having a substituent. In case where the phenyl group has a substituent, the substituent is preferably an alkyl group, more preferably an alkyl group having from 1 to 5 carbon atoms; and the number of the substituents may be 2 or more.

Specific examples of the organic acid represented by the formula (8) are shown below, to which, however, the invention should not be limited.

(8-1)

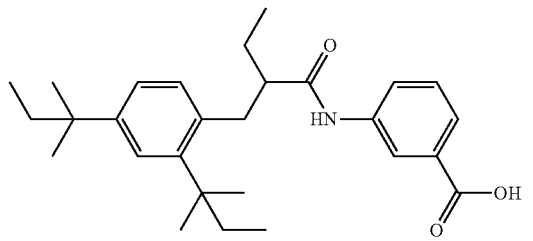

(8-2)

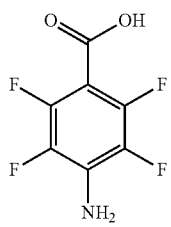

(8-3)

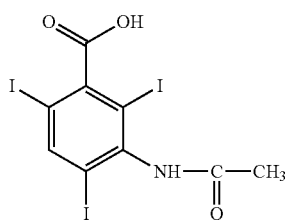

Also preferably, the organic acid having a specific acid dissociation constant contains a heterocyclic structure having an oxygen atom, a nitrogen atom or a sulfur atom.

The organic acid having a specific acid dissociation constant for use in the invention is commercially available, or may be produced according to a known method. For example, the organic acid of the formula (6) may be produced according to the production method described in JP-B 2-30498.

Preferably, the amount of the organic acid having a specific acid dissociation constant is from 1 to 20% by mass of the resin used in the substrate film. When the amount is at least 1% by mass, the film can readily secure the effect of enhancing polarizing element durability; and when at most 20% by mass, then the organic acid hardly bleeds out in the produced polarizer protective film. The content of the organic acid having a specific acid dissociation constant is more preferably from 1 to 15% by mass, even more preferably from 1 to 10% by mass.

(Compound of Formula (9))

A compound represented by the following formula (9) is also preferred as the organic acid in the invention.

$$X^{11}\text{-}L^{11}\text{-}(R^{401})_n \qquad \text{Formula (9)}$$

wherein $X^{11}$ represents an acid group having an acid dissociation constant of at most 7.0; $L^{11}$ represents a single bond or a linking group having a valence of at least two; $R^{401}$ represents an alkyl group having from 6 to 30 carbon atoms, an alkenyl group having from 6 to 30 carbon atoms, an alkynyl group having from 6 to 30 carbon atoms, an aryl group having from 6 to 30 carbon atoms or a heterocyclic group having from 6 to 30 carbon atoms, which may optionally have a substituent; n is 1 when $L^{11}$ is a single bond, and is the valence of the linking group represented by $L^{11}$ minus 1 when $L^{11}$ is a linking group having a valence of at least two.

In the formula (9), $X^{11}$ represents an acid group having an acid dissociation constant of from 2 to 7.0, and is preferably a carboxyl group, a sulfonic acid group, a sulfinic acid group, a phosphoric acid group, a sulfonimide group or an ascorbic acid group, more preferably a carboxyl group or a sulfonic acid group, most preferably a carboxyl group. In case where $X^{11}$ is an ascorbic acid group, preferably, 5- and 6-positioned hydrogen atoms of the ascorbic acid are removed and the resulting residue bonds to $L^{11}$.

In the formula (9), $R^{401}$ represents an alkyl group (optionally having a substituent), an alkenyl group (optionally having a substituent), an alkynyl group (optionally having a substituent), an aryl group (optionally having a substituent) or a heterocyclic group (optionally having a substituent) each having from 6 to 30 carbon atoms. The substituent includes a halogen atom, an aryl group, a heterocyclic group, an alkoxy group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulforyl group, a carboxyl group, etc.

More preferably, $R^{401}$ is an alkyl group, an alkenyl group or an alkynyl group having from 8 to 24 carbon atoms, most preferably a linear alkyl or alkynyl group having from 10 to 24 carbon atoms.

Preferably, $L^{11}$ in the formula (9) is a single bond, or a linking group having a valence of at least two (i.e. single bond, or divalent or more polyvalent linking group) derived from the following unit group, or derived from a combination of any of those units:
Unit: —O—, —CO—, —N(—$R^{402}$)— (where $R^{402}$ represents an alkyl group having from 1 to 5 carbon atoms), —CH=CH—, —CH(OH)—, —CH$_2$—, —SO$_2$—.

More preferably, $L^{11}$ in the formula (9) is a single bond or has an ester group-derived linking group (—COO—, —OCO—) or an amide group-derived linking group (—CONR$^{402}$—, —NR$^{402}$CO—) as the partial structure thereof.

$L^{11}$ may have a substituent, and the substituent is not specifically defined. As the substituent, there may be mentioned the same type of the substituent as that $R^{401}$ has. Above all, preferred is —OH.

Of the above, $L^{11}$ is more preferably a linking group that contains a glycerin-derived group.

Concretely, $L^{11}$ preferably has the following structure. In the following, p, q and r each indicate an integer of from 1 to 40, preferably from 1 to 20, more preferably from 1 to 10, even more preferably from 1 to 6. q is especially preferably from 2 to 4.
—(CH$_2$)$_p$—CO—O—(CH$_2$)$_q$—O—;
—(CH$_2$)$_p$—CO—O—(CH$_2$)$_q$—(CH(OH))—(CH$_2$)$_r$—O—;
—(CH$_2$)$_p$—CO—O—(CH$_2$)$_q$—(CH(OCO—R$^{403}$))—(CH$_2$)$_r$—O—;
—(CH$_2$)$_p$—CO—O—(CH$_2$)$_q$—(CH(OH))—(CH$_2$)$_r$—O—CO—;
—(CH$_2$)$_p$—CO—O—(CH$_2$)$_q$—(CH(OCO—R$^{403}$))—(CH$_2$)$_r$—O—CO—.

$R^{403}$ in the specific examples of $L^{11}$ mentioned above has the same meaning as that of $R^{401}$ in the formula (1) mentioned above. Specifically, $R^{403}$ in the linking group of —(CH$_2$)$_p$—CO—O—(CH$_2$)$_q$—(CH(OCO—R$^{403}$))—(CH$_2$)$_r$—O— is described inside $L^{11}$ only for convenience' sake, and the linking group $L^{11}$ means the moiety from which $R^{403}$ has been removed. In other words, in this case, $L^{11}$ is trivalent. When expressed in the form of the formula (9), the group may be represented by $X^{11}$-$L^{11}$-($R^{401}$)$_2$, [where $L^{11}$ represents —(CH$_2$)$_p$—CO—O—(CH$_2$)$_q$—(CH(OCO—))—(CH$_2$)$_r$—O—], or that is, the linking group $L^{11}$ in this case is a trivalent linking group.

Preferably, $L^{11}$ and $X^{11}$ bond to each other via an ester bond or an amide bond, more preferably via an ester bond. Also preferably, X does not have an ester bond or an amide bond.

Preferably, $L^{11}$ and $R^{401}$ bond to each other via an ester bond, an ether bond or an amide bond, more preferably via an ester bond or an amide bond, even more preferably via an ester bond. Also preferably, $R^{401}$ does not have an ester bond, an ether bond and an amide bond.

<<Fatty Acid>>
Myristic acid, palmitic acid, stearic acid, oleic acid, linolic acid, linolenic acid, recinoleic acid, undecanoic acid.

<<Alkylsulfuric Acid>>
Myristylsulfuric acid, cetylsulfuric acid, oleylsulfuric acid.

<<Alkylbenzenesulfonic Acid>>
Dodecylbenzenesulfonic acid, pentadecylbenzenesulfonic acid.

<<Alkylnaphthalenesulfonic Acid>>
Sesquibutylnaphthalenesulfonic acid, diisobutylnaphthalenesulfonic acid.

<<Dialkylsulfosuccinic Acid>>
Dioctylsulfosuccinic acid, dihexylsulfosuccinic acid, dicyclohexylsulfosuccinic acid, diamylsulfosuccinic acid, ditridecylsulfosuccinic acid.

<<Polycarboxylic Acid, and Partial Derivative of Polycarboxylic Acid>>
The organic acid of the formula (9) is preferably a partial derivative of a polycarboxylic acid. In this description, the partial derivative of a polycarboxylic acid has a structure where one molecule of a fatty acid and a polycarboxylic acid are ester-bonded to one molecule of a polyalcohol, and is a compound having at lest one unsubstituted acid group derived from a polycarboxylic acid. In this description, the fatty acid means an aliphatic monocarboxylic acid. Specifically, the fatty acid in this description is not limited to a so-called higher fatty acid but includes a lower fatty acid having at most 12 carbon atoms such as acetic acid, propionic acid, etc.

The partial derivative of a polycarboxylic acid is preferably a partial derivative of a polycarboxylic acid. Above all, the organic acid of formula (9) comprising a structure wherein one molecule of fatty acid and one molecule of poly carboxylic acid bond to one molecule of polyalcohol by ester bond, wherein the structure has at least one of unsubstituted carboxyl group derived from the poly carboxylic acid. The polycarboxylic acid for the partial derivative of a polycarboxylic acid is not specifically defined, for which, for example, preferred are succinic acid, citric acid, tartaric acid, diacetyltartaric acid, malic acid, adipic acid.

The polyalcohol for the partial derivative of a polycarboxylic acid includes adonitol, arabitol, ethylene glycol, diethylene glycol, triethylene glycol, tetraethylene glycol, 1,2-propanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, glycerin, etc. In those, preferred are glycerin and so it is preferably that the organic acid represented by formula (9) is a so-called organic acid monoglyceride.

As the organic acid represented by the formula (9), preferred is an organic acid glyceride in which the acid group $X^{11}$ in the acid group moiety bonds to the hydrophobic moiety $R^{401}$ via the linking group $L^{11}$ containing a glycerin-derived group (glycerin fatty acid organic ester). In this description, the organic acid glyceride means a compound which is so designed that one or two of the three hydroxyl groups of glycerin therein form an ester bond with a fatty acid, the remaining one or two hydroxyl groups each form an ester bond with a polyvalent organic acid, and the structure of the compound has an acid group derived from the polyvalent organic acid.

Above all, more preferred is an organic acid monoglyceride or an organic acid diglyceride, and even more preferred is an organic acid monoglyceride. The organic acid monoglyceride in this description is a compound having a structure in which one of the three hydroxyl groups of glycerin forms an ester bond with a fatty acid and the remaining one or two hydroxyl groups form an ester bond with a polycarboxylic acid and which has an acid group derived from the polycarboxylic acid. The organic acid diglyceride in this description is a compound having a structure in which two of the three hydroxyl groups of glycerin form an ester bond with a fatty acid and the remaining one hydroxyl group forms an ester bond with a polycarboxylic acid and which has an acid group derived from the polycarboxylic acid.

Of the organic monoglyceride, more preferred is one having a structure in which one of the three hydroxyl groups of glycerin forms an ester bond with a fatty acid and the remaining one hydroxyl group is an unsubstituted hydroxyl group and the last one hydroxyl group forms an ester bond with a polycarboxylic acid and which has an acid group derived from the polycarboxylic acid. Preferably, the hydroxyl group ester-bonding to the fatty acid in the organic acid monoglyceride is in an asymmetric position (so-called α-monoglyceride position), and the hydroxyl group ester-bonding to the polyorganic acid in the organic acid monoglyceride is similarly in an asymmetric position (so-called α-monoglyceride position). Specifically, of the above-mentioned organic monoglyceride, preferred is one having a structure which has an unsubstituted hydroxyl group and in which the carbon atom directly bonds to the hydroxyl group that ester-bonds to the fatty acid and the carbon atom directly bonds to the hydroxyl group that ester-bonds to the polycarboxylic acid do not lie next to each other.

Of the above-mentioned organic monoglyceride, especially preferred is a polycarboxylic acid monoglyceride. The polycarboxylic acid monoglyceride has at least one unsubstituted carboxyl group of the polycarboxylic acid moiety and the other carboxyl groups are substituted with a monoglyceride. More preferred is a carboxyl group-having organic acid monoglyceride in which one fatty acid molecule and one polyvalent carboxylic acid molecule bond to one glycerin molecule.

The polycarboxylic acid for the monoglyceride of a polycarboxylic acid is not specifically defined, for which, for example, preferred are succinic acid, citric acid, tartaric acid, diacetyltartaric acid, malic acid, adipic acid.

The fatty acid for the monoglyceride of a polycarboxylic acid is not specifically defined, for which is preferred a saturated or unsaturated fatty acid having from 8 to 22 carbon atoms. Concretely mentioned are caprylic acid, capric acid, lauric acid, myristic acid, palmitic acid, stearic acid, behenic acid, oleic acid, etc.

The carboxyl group-having organic acid monoglyceride for use in the film of the invention is described in detail hereinafter.

The carboxyl group-having organic acid monoglyceride usable in the film of the invention may be obtained by reacting a polyorganic acid anhydride and a fatty acid monoglyceride generally according to the method described in JP-A 4-218597 and Japanese Patent No. 3823524.

The reaction is attained generally in the absence of a solvent, and for example, the reaction of succinic acid and a fatty acid monoglyceride having 18 carbon atoms may be attained at a temperature of around 120° C. and may be completed within about 90 minutes. Thus obtained, the organic acid monoglyceride is generally a mixture containing an organic acid, unreacted monoglyceride and diglyceride and other oligomers. In the invention, the mixture may be used directly as it is.

For increasing the purity of the carboxyl group-having organic acid monoglyceride, the carboxyl group-having organic acid monoglyceride may be isolated from the mixture through distillation or the like. The carboxyl group-having organic acid monoglyceride having a high purity is commercially available as a distilled monoglyceride, which may be used in the invention. Commercial products of the carboxyl group-having organic acid monoglyceride include, for example, Riken Vitamin's Poem K-37V (citric and oleic acid esters of glycerol), Kao's Step SS (succinic acid monoglyceride in which stearic acid/palmitic acid monoglyceride bonds to succinic acid), etc.

The amount of the organic acid of formula (9) to be in the film of the invention is in a ratio of from 0.01% by mass to 10% by mass relative to the cellulose acylate, preferably from 0.1% by mass to 10% by mass, more preferably from 0.5% by mass to 10% by mass, particularly preferably from 1.5% by mass to 5% by mass, even more preferably from 2.5% by mass to 5% by mass.

When the amount is at least 0.01% by mass, then the polarizing element durability improving effect and the releasability improving effect of the resin film are satisfactory. When the amount is at most 20% by mass, then it is favorable since the organic acid hardly bleeds out when aged in high-temperature and high-humidity condition and since the vertical transmittance of the polarizer that comprising the film hardly increases.

The concentration of the organic acid of formula (9) to be in the film of the invention is preferably from 0.2 to 40 mmol per 100 g of the film, more preferably from 0.5 to 5 mmol, even more preferably from 0.6 to 4.5 mmol, still more preferably from 0.8 to 4.0 mmol.

<1-4: Other Additives>

The cellulose acylate film may contain various additives of a polycondensation-type polymer, a retardation regulator (retardation enhancer, retardation reducer), a plasticizer such as a phthalate, a phosphate or the like, a UV absorbent, an antioxidant, a matting agent or the like, as the other additive than the compound of the formula (1) and the above-mentioned organic acid.

(Polycondensation-Type Polymer)

Preferably, the cellulose acylate film contains a polycondensation-type polymer from the viewpoint of reducing the haze thereof.

As the polycondensation-type polymer, herein widely usable is a high-molecular additive known as an additive to cellulose acylate films. The content of the additive is preferably from 1 to 35% by mass relative to the cellulose resin, more preferably from 4 to 30% by mass, even more preferably from 10 to 25% by mass.

The high-molecular additive that is used as the polycondensation-type polymer in the cellulose acylate film is a compound having a recurring unit therein, and is preferably one having a number-average molecular weight of from 700 to 10000. The high-molecular additive has the function of promoting the solvent evaporation speed in the solution casting method, and the function of reducing the residual solvent amount therein. Further, the additive exhibits various useful effects from the viewpoint of improving the properties of the film, for example, improving the mechanical properties of the film, imparting softness to the film, imparting water absorption resistance thereto, reducing the moisture permeability of the film, etc.

The number-average molecular weight of the high-polymer additive, or that is, the polycondensation-type polymer for use in the invention is more preferably from 700 to 8000, even more preferably from 700 to 5000, still more preferably from 1000 to 5000.

The polycondensation-type polymer, or that is, the high-molecular additive for use in the invention is described in detail hereinunder with reference to its specific examples given below. Needless-to-say, however, the high-molecular additive of the polycondensation-type polymer for use in the invention is not limited to those mentioned below.

Preferably, the polycondensation-type polymer is a non-phosphate-type ester compound. The "non-phosphate-type ester compound" means an ester compound not including phosphates.

The polymer additive of the polycondensation-type polymer includes polyester polymers (aliphatic polyester polymers, aromatic polyester polymers, etc.), and copolymers of a polyester ingredient and any other ingredient. Preferred are aliphatic polyester polymers, aromatic polyester polymers, copolymers of a polyester polymer (aliphatic polyester polymer, aromatic polyester polymer, etc.) and an acrylic polymer, and copolymers of a polyester polymer (aliphatic polyester polymer, aromatic polyester polymer, etc.) and a styrenic polymer; and more preferred are polyester compounds having an aromatic ring moiety as at least one copolymerization ingredient.

The aliphatic polyester-type polymers is one produced by reaction of a mixture of an aliphatic dicarboxylic acid having from 2 to 20 carbon atoms, and a diol selected from the group consisting of aliphatic diols having from 2 to 12 carbon atoms and alkyl ether diols having from 4 to 20 carbon atoms. Both ends of the reaction product may be as such, or may be blocked by further reaction with monocarboxylic acids, monoalcohols or phenols. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic having from 4 to 20 carbon atoms, or an aromatic dicarboxylic acid having from 8 to 20 carbon atoms.

The aliphatic dicarboxylic acids having from 2 to 20 carbon atoms preferably used in the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. Particularly preferred aliphatic dicarboxylic acids are succinic acid, glutaric acid and adipic acid.

The diol used for the high molecular weight agent are selected, for example, from aliphatic diols having from 2 to 20 carbon atoms and alkyl ether diols having from 4 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

In the invention, especially preferred is a high molecular weight agent of which the terminal is blocked with an alkyl group or an aromatic group. The terminal protection with a hydrophobic functional group is effective against aging at high temperature and high humidity, by which the hydrolysis of the ester group is retarded.

Preferably, the high molecular weight agent is protected with a monoalcohol residue or a monocarboxylic acid residue in order that both ends of the high molecular weight agent are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol and benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, p-tert-amylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high molecular weight agent may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The compounds having a positive birefringence are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

The aromatic polyester-type polymers are those produced by copolymerization of the polyester polymer and a monomer having an aromatic ring. The monomer having an aromatic ring is preferably at least one monomer selected from an aromatic dicarboxylic acid having from 8 to 20 carbon atoms and an aromatic diol having from 6 to 20 carbon atoms.

The aromatic dicarboxylic acids having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, etc. More preferred aromatic dicarboxylic acids in these are phthalic acid, terephthalic acid and isophthalic acid.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

For the aromatic polyester polymer, in this invention, combined is the above-mentioned polyester and at least one of aromatic dicarboxylic acids and aromatic diols, in which the combination mode is not specifically defined. Different types of the ingredients may be combined in any desired mode. In the invention, especially preferred is the polymer additive terminated with an alkyl group or an aromatic group, as described above. For the termination, employable is the above-mentioned method.

(Retardation Reducer)

As the retardation reducer in the invention, widely employable are phosphate compounds and compounds except non-phosphate compounds known as additives to cellulose acylate film.

The polymer-type retardation reducer usable herein is selected from phosphate-type polyester polymers, styrenic polymers, acrylic polymers and their copolymers; and preferred are acrylic polymers and styrenic polymers. Preferably, the film in the invention contains at least one polymer having an inherent negative birefringence, such as styrenic polymers and acrylic polymers.

The low-molecular retardation reducer that is a compound except non-phosphate compounds includes the following. These may be solid or oily. Briefly, the melting point and the boiling point of the compounds are not specifically defined. For example, there may be mentioned a mixture of UV absorbent materials in which the melting or boiling point of one material is not higher than 20° C. and that of the other is higher than 20° C., and a mixture of degradation inhibitors of the same type as above. IR absorbent dyes usable herein are described, for example, in JP-A 2001-194522. The time when the additive is added may be at any time in the cellulose acylate solution (dope) production step. As the case may be, a step of adding the additive may be additionally provided in the final stage after the dope preparation step. The amount of the material to be added is not specifically defined so far as the material can express its function.

The low-molecular retardation reducer that is a compound except non-phosphate compounds is not specifically defined, and its details are described in JP-A 2007-272177, [0066] to [0085].

The compounds represented by the formula (1) in JP-A2007-272177, [0066] to [0085] can be produced according to the following method.

The compound of the formula (1) in the patent publication can be produced through condensation of a sulfonyl chloride derivative and an amine derivative.

The compound represented by the genera formula (2) in JP-A 2007-272177 can be produced through dehydrating condensation of a carboxylic acid and an amine using a condensing agent (for example, dicyclohexylcarbodiimide (DCC), etc.), or through substitution reaction of a carboxylic acid chloride derivative and an amine derivative.

The retardation reducer is preferably an Rth reducer from the viewpoint of realizing a favorable Nz factor. The Rth reducer of the retardation reducer includes acrylic polymers and styrenic polymers as well as low-molecular compounds of the formulae (3) to (7). Of those, preferred are acrylic polymers and styrenic polymers, and more preferred are acrylic polymers.

Preferably, the retardation reducer is added in a ratio of from 0.01 to 30% by mass relative to the cellulose resin, more preferably from 0.1 to 20% by mass, even more preferably from 0.1 to 10% by mass.

When the amount is at most 30% by mass, the compatibility of the compound with the cellulose resin can be bettered, and the formed film can be prevented from whitening. In case where two or more different types of retardation reducers are used, preferably, their total amount is within the above range.

(Retardation Enhancer)

Preferably, the cellulose acylate film contains at least one retardation enhancer in the above-mentioned low-substitution layer for the purpose of expressing the retardation value thereof. The retardation enhancer is not specifically defined. There may be mentioned rod-shaped or discotic compounds, as well as those of the above-mentioned non-phosphate compounds that have a retardation enhancing capability. As the rod-shaped or discotic compounds, compounds having at least two aromatic rings are preferably used herein as the retardation enhancer.

The amount to be added of the retardation enhancer of a rod-shaped compound is preferably from 0.1 to 30 parts by mass relative to 100 parts by mass of the polymer ingredient containing cellulose acylate, more preferably from 0.5 to 20 parts by mass. Preferably, the amount of the discotic compound contained in the retardation enhancer is less than 3 parts by mass relative to 100 parts by mass of the cellulose acylate, more preferably less than 2 parts by mass, even more preferably less than 1 part by mass.

Discotic compounds are superior to rod-shaped compounds in point of the Rth retardation enhancing capability thereof, and therefore the former is favorably used when an especially large Rth retardation is needed. Two or more different types of retardation enhancers may be used here as combined.

Preferably, the retardation enhancer for use herein has a maximum absorption in a wavelength region of from 250 to 400 nm, but doe not have any substantial absorption in the visible region.

The details of the retardation enhancer are described in Disclosure Bulletin 2001-1745, p. 49.

(Plasticizer)

Many compounds known as a plasticizer for the cellulose acylate may be used for the invention as the plasticizer. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates include butyl oleate, methylacetyl ricinoleate, dibutyl sebacate, and various trimellitates. Preferred for use herein are phthalate plasticizers (DMP, DEP, DBP, DOP, DPP, DEHP). More preferred are DEP and DPP.

(Antioxidant Except Compounds of Formula (1))

In the invention, a known antioxidant, for example, a phenolic or hydroquinone-type antioxidant such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl tetrakis[3-(3,5-di-tert-butyl-4-hydroxyphenyl)propionate] or the like may be added to the cellulose acylate solution. Preferred is use of a phosphate-type antioxidant such as tris(4-methoxy-3,5-diphenyl) phosphite, tris(nonylphenyl) phosphite, tris(2,4-di-tert-butylphenyl) phosphite, bis(2,6-di-tert-butyl-4-methylphenyl) pentaerythritol diphosphite, bis(2,4-di-tert-butylphenyl)pentaerythritol diphosphite, etc. Preferably, the amount of the antioxidant to be added is from 0.05 to 5.0 parts by mass relative to 100 parts by mass of the cellulose resin.

(UV Absorbent)

In the invention, a UV absorbent may be added to the cellulose acylate solution from the viewpoint of preventing the degradation of polarizer, liquid crystal, etc. As the UV absorbent, preferred are those excellent in UV absorbability at a wavelength of 370 nm or less and poorly absorbing visible light having a wavelength of 400 nm or more, from the viewpoint of securing good liquid crystal display performance. Specific examples of the UV absorbent preferred for use in the invention include, for example, hindered phenolic compounds, hydroxybenzophenone compounds, benzotriazole compounds, salicylate compounds, benzophenone compounds, cyanoacrylate compounds, nickel complex compounds, etc. Examples of the hindered phenolic compounds include 2,6-di-tert-butyl-p-cresol, pentaerythrityl tetrakis[3-(3,5-di-tert-butyl-4-hydroxyphenyl) propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, tris-(3,5-di-tert-butyl-4-hydroxybenzyl) isocyanurate, etc. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, pentaerythrityl tetrakis[3-(3,5-di-tert-butyl-4-hydroxyphenyl)propionate], etc. The amount of the UV inhibitor is preferably from 1 ppm to 1.0% by mass in the entire optical film, more preferably from 10 to 1000 ppm.

(Matting Agent)

A matting agent may be added to the cellulose acylate film from the viewpoint of securing film slidability and securing safe production. The matting agent may be an inorganic compound matting agent or an organic compound matting agent.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 18, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called direct addition method, in which the ingredients may be on-line mixed by screw kneading. Concretely, preferred is a static mixer such as an in-line mixer. As the in-line mixer, for example, preferred is a static mixer, SWJ (Toray's static tubular mixer, Hi-Mixer, by Toray Engineering). Regarding the mode of in-line addition, JP-A 2003-053752 describes an invention of a method for producing a cellulose acylate film wherein, for the purpose of preventing concentration unevenness and particle aggregation, the distance L between the nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A 2003-014933 discloses an invention of providing a retardation film which is free from a trouble of additive bleeding and a trouble of interlayer peeling and which has good lubricity and excellent transparency; and regarding the method of adding additives to the film, the patent reference says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

Unless the matting agent is added too much to the cellulose acylate film, the haze of the film does not increase; and in fact, in a case where the film is used in LCD, the matting agent added thereto does not cause any inconveniences of contrast reduction, bright spot generation, etc. On the other hand, when the amount is too small, then the problem of film grating could not be solved and the abrasion resistance of the film could not be realized. From these viewpoints, preferably, the matting agent is added in a ratio of from 0.01 to 5.0% by weight, more preferably from 0.03 to 3.0% by weight, even more preferably from 0.05 to 1.0% by weight.

<1-5: Configuration and Physical Properties of Cellulose Acylate Film>

(Layer Configuration of Film)

The cellulose acylate film may be a single layer or a laminate of two or more layers.

In case where the cellulose acylate film is a two-layer or more multi-layer laminate, it is preferably a two-layer laminate or a three-layer laminate, more preferably a three-layer laminate. Preferably, the three-layer laminate has a layer of the film of the invention that is kept in contact with the metal support in producing the film according to a solution casting method (hereinafter this may be referred to as support-side layer or skin B layer), and an air interface layer opposite to the metal support (hereinafter this may be referred to as an air-side layer or skin A layer), and one core layer sandwiched between them. Specifically, the film of the invention has a three-layer configuration of skin B layer/core layer/skin A layer.

In case where the cellulose acylate film is a two-layer or more multi-layer laminate, the layer that contains the above-mentioned hindered amine compound is not specifically defined. Preferably, however, in the invention, the cellulose acylate film comprises a core layer and at least one skin layer laminated on the surface of the core layer, and of the skin layers, one that is adjacent to the active energy ray-curable layer contains the hindered amine compound. Having the configuration of the type, the film of the invention can more readily exhibit the adhesiveness enhancing effect thereof.

In the cellulose acylate film, the degree of acyl substitution in each layer may be the same, or a plurality of cellulose acylates may be made to form one layer as mixed. In the latter case, preferably, the degree of acyl substitution of the cellulose acylate in every layer is all the same from the viewpoint of controlling the optical properties of the film. In case where the cellulose acylate film has a three-layer configuration, preferably, the cellulose acylate contained in both surface layers of the film has the same degree of acyl substitution from the viewpoint of the production cost of the film.

(Haze)

Preferably, the haze of the cellulose acylate film is less than 0.20%, more preferably less than 0.15%, even more preferably less than 0.10%. When the haze is less than 0.2%, and when the film is incorporated in a liquid crystal display device, the contrast ratio of the device can be bettered. In addition, the film has higher transparency and is advantageous for use thereof as an optical film.

(Film Thickness)

Of the cellulose acylate film, the mean thickness of the low-substitution layer is preferably from 30 to 100 μm, more preferably from 30 to 80 μm, even more preferably from 30 to 70 μm. When the thickness is at least 30 μm, then it is favorable since the handlability in producing a web-like film is bettered. When the thickness is at most 70 μm, the film is resistant to humidity change and can secure the optical properties thereof.

In case where the cellulose acylate film has a three-layer or more multi-layer laminate structure, the thickness of the core layer is preferably from 30 to 70 μm, more preferably from 30 to 60 μm, even more preferably from 30 to 50 μm. In case where the film of the invention has a three-layer or more multi-layer laminate structure, the thickness of the two surface layers (skin A layer and skin B layer) on both sides of the film is from 0.5 to 20 μm each, more preferably from 0.5 to 10 μm each, even more preferably from 0.5 to 3 μm each.

(Film Width)

Preferably, the cellulose acylate film has a width of from 700 to 3000 mm, more preferably from 1000 to 2800 mm, even more preferably from 1500 to 2500 mm.

<1-6: Production Method for Cellulose Acylate Film>

The production method for the cellulose acylate film for use in the invention is described in detail hereinunder.

Preferably, the cellulose acylate film is produced according to a solvent casting method. For production examples of cellulose acylate film according to a solvent casting method, referred to are U.S. Pat. Nos. 2,336,310, 2,367,603, 2,492,078, 2,492,977, 2,492,978, 2,607,704, 2,739,069, 2,739,070; British Patent 640731, 736892; JP-B 45-4554, 49-5614; JP-A 60-176834, 60-203430, 62-115035, etc. The cellulose acylate film may be stretched. For the method of stretching treatment and the condition thereof, referred to are, for example, JP-A 62-115035, 4-152125, 4-284211, 4-298310, 11-48271, etc.

(Dope Solvent)

In the solvent casting method, a solution (dope) prepared by dissolving cellulose acylate in an organic solvent is used for producing film.

Preferably, the organic solvent contains a solvent selected from ethers having from 3 to 12 carbon atoms, ketones having from 3 to 12 carbon atoms, esters having from 3 to 12 carbon atoms, and halogenohydrocarbons having from 1 to 6 carbon atoms.

The ethers, ketones and esters may have a cyclic structure. Compounds having any two or more of the functional groups of ethers, ketones and esters (that is, —O—, —CO— and —COO—) are also usable here as the organic solvent. The organic solvent may have any other functional group such as an alcoholic hydroxyl group. In the organic solvent having two or more different types of functional groups, the number of the carbon atoms of the functional group is preferably within the above-mentioned preferred range of the carbon atom number of the solvent having any of the functional groups.

Examples of the ethers having from 3 to 12 carbon atoms include diisopropyl ether, dimethoxymethane, dimethoxyethane, 1,4-dioxane, 1,3-dioxolan, tetrahydrofuran, anisole and phenetol.

Examples of the ketones having from 3 to 12 carbon atoms include acetone, methyl ethyl ketone, diethyl ketone, diisopropyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvent having two or more different types of functional groups include 2-ethoxyethyl acetate, 2-methoxyethanol and 2-butoxyethanol.

Preferably, the carbon number of the halogenohydrocarbons is 1 or 2, most preferably 1. Preferably, the halogen of the halogenohydrocarbons is chlorine. The ratio of substitution of hydrogen with halogen in the halogenohydrocarbons is preferably from 25 to 75 mol %, more preferably from 30 to 70 mol %, even more preferably from 35 to 65 mol %, most preferably from 40 to mol %. Methylene chloride is one typical halogenohydrocarbon.

In the invention, a mixture of methylene chloride and alcohol is preferred for the organic solvent. Preferably, the ratio by mass of methylene chloride/alcohol is from 6/94 to 40/60, more preferably from 7/93 to 30/70, even more preferably from 8/92 to 25/75. As the alcohol, preferred is methanol, ethanol or n-butanol; and two or more different types of alcohols may be used as combined. When the ratio of alcohol to methylene chloride is defined to fall within the above range, then favorably, the mechanical strength of the film surface may be enhanced and, after an active energy ray-curable layer is formed by coating thereon, the interlayer peeling between the active energy ray-curable layer and the cellulose acylate film can be prevented.

The cellulose acylate solution can be prepared according to an ordinary method at a temperature not lower than 0° C. (room temperature or high temperature). The solution can be prepared using the preparation method and apparatus for dope preparation in an ordinary solvent casting method. In the ordinary method, preferably, a halogenohydrocarbon (especially methylene chloride) is used as the organic solvent.

The amount of cellulose acylate is so controlled that its content in the obtained solution could be from 10 to 40% by mass. More preferably, the amount of cellulose acylate is from 10 to 30% by mass. To the organic solvent (main solvent), any additive mentioned below may be added.

The solution may be prepared by stirring cellulose acylate and organic solvent at room temperature (0 to 40° C.). A high-concentration solution may be stirred under pressure and under heat. Concretely, cellulose acylate and organic solvent are put into a pressure container and sealed up, and stirred with heating at a temperature falling within a range of from the boiling point at room temperature of the solvent under pressure to a temperature at which the solvent does not boil.

The heating temperature is generally 40° C. or higher, preferably from 60 to 200° C., more preferably from 80 to 110° C.

The ingredients may be put into a container after previously mixed. They may be put into a container one after another. The container must be so designed that the contents therein could be stirred. An inert gas such as nitrogen gas or the like may be introduced into the container to increase the pressure therein. The increase in the vapor pressure of the solvent by heating may also be utilized. As the case may be, after the container has been closed, the ingredients may be added thereto under pressure.

For heating, preferably, the container is heated from outside. For example, usable is a jacket-type heating unit. As the case may be, a plate heater may be arranged outside the container and connected thereto, and a liquid may be circulated through the heater to thereby heat the entire container.

A stirring blade may be arranged inside the container, and stirring the contents with it is also preferred. Preferably, the stirring blade can reach near the wall of the container. Preferably, a scraper is arranged at the end of the stirring blade for the purpose of renewing the liquid film on the wall of the container.

The container may be equipped with indicators such as a pressure gauge, a thermometer, etc. The ingredients are dissolved in a solvent in the container. The prepared dope is taken out of the container after cooled, or after taken out, the dope is cooled with a heat exchanger.

(Casting Method)

The solution casting method includes a method of extruding the prepared dope uniformly onto a metal support through a pressure die; a method in which the dope once cast onto a metal support is leveled with a blade to control the thickness of the formed film; a method of using a reverse roll coater in which the film thickness is controlled by the reversely-rotating roll, etc. Preferred is the method of using a pressure die. The pressure die includes a coat-hanger type die, a T-die, etc., any of which is favorably usable here. Apart from the methods described herein, any other various types of known methods for producing films by casting cellulose triacetate solution are employable here. In consideration of the difference in the boiling point of the solvents used, the casting condition may be settled, and the same effects as those described in the related patent publications can also be obtained here.

<<Co-Casting>>

In producing the cellulose acylate film, preferably used is a lamination casting method such as a co-casting method, a successive casting method, a coating method, etc. More preferred is a simultaneous co-casting method from the viewpoint of stable production and production cost reduction.

Figure 2:
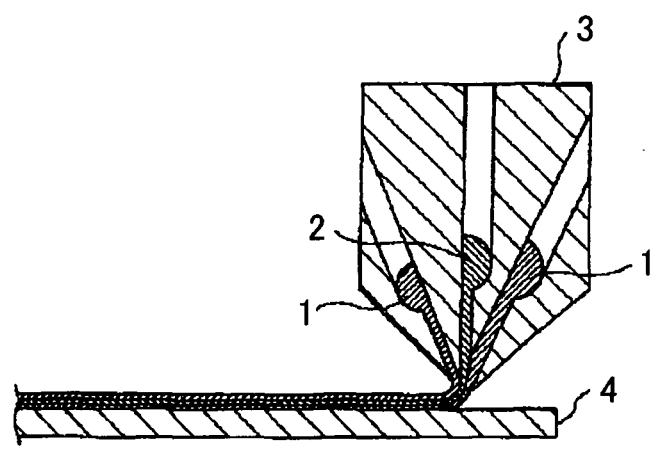
FIG. 2 is a schematic view showing one example of a casting mode to form a three-layer cellulose acylate film according to a simultaneous co-casting method using a co-casting die.

In case where the film is produced according to a co-casting method or a successive casting method, first prepared is the cellulose acetate solution (dope) for each layer. In the co-casting method (multilayer simultaneous casting method), co-casting dopes are simultaneously extruded out through a casting Giesser through which the individual casting dopes for the intended layers (three or more layers) are simultaneously cast via different slits onto a casting metal support (band or drum), and at a suitable time, the film formed on the metal support is peeled away and dried. FIG. 2 is a cross-sectional view showing a mode of simultaneous extrusion to form three layers by casting the dope 1 for surface layer and the dope 2 for core layer on a casting metal support 4 through a co-casting Giesser 3.

The successive-casting method is as follows: First the dope for outermost layer is extruded out and cast onto a casting metal support through a casting Giesser, then after it is dried or not dried, the casting dope for second layer is cast onto it in a mode of extrusion through a casting Giesser, and if desired, three or more layers are successively formed in the same mode of casting and lamination, and at a suitable time, the resulting laminate film is peeled away from the metal support and dried. The coating method is generally as follows: A film of a core layer is formed according to a solution casting method, then a coating solution for surface layer is prepared, and using a suitable coater, the coating solution is applied onto the previously formed core film first on one surface thereof and next on the other surface thereof, or simultaneously on both surfaces thereof, and the resulting laminate film is dried.

Preferably, the organic acid represented by the formula (9) is made to locally exist on one surface side of the film from the viewpoint of enhancing the peelability of the film and enhancing the polarizing element durability. Regarding the method for making the organic acid of the formula (9) locally exist on one surface side of the film, preferably employed here is a method of adding a large amount of the organic acid of the formula (9) only to the casting solution for the specific layer.

Specifically, in case where the organic acid of the formula (9) is made to locally exist on one surface side of the film, it is desirable that the dopes for at least two layers are co-cast onto the metal support, and the organic acid of the formula (9) is added in a larger amount to any one of the dope for the layer to be in contact with the metal support surface or the dope for the air interface layer, as compared with the amount of the acid to the other dope.

As the endlessly running metal support for use in producing the cellulose acylate film, usable is a drum of which the surface is mirror-finished by chromium plating, or a stainless belt (band) of which the surface is mirror-finished by polishing. One or more pressure dies may be arranged above the metal support. Preferably, one or two pressure dies are arranged. In case where two or more pressure dies are arranged, the dope to be cast may be divided into portions suitable for the individual dies; or the dope may be fed to the die at a suitable proportion via a plurality of precision metering gear pumps. The temperature of the dope (resin solution) to be cast is preferably from −10 to 55° C., more preferably from 25 to 50° C. In this case, the solution temperature may be the same throughout the entire process, or may differ in different sites of the process. In case where the temperature differs in different sites, the dope shall have the desired temperature just before cast.

The material of the metal support is not specifically defined. Preferably, the metal support is formed of SUS (for example, SUS 316).

(Stretching Treatment)

The method for producing the cellulose acylate film preferably includes a step of stretching the formed film. As described in the above, the film of the invention is preferably improved in point of the wavelength dispersion characteristics of retardation thereof; and the stretching treatment makes it possible to impart the optical property to the stretched cellulose acylate film and to impart the desired retardation thereto. The stretching direction of the cellulose acylate film may be preferably any of the film traveling direction or the direction perpendicular to the film traveling direction (cross direction). More preferably, the film is stretched in the direction perpendicular to the film traveling direction (cross direction) from the viewpoint of the subsequent process of using the film for producing a polarizer.

The method of stretching in the cross direction is described, for example, in JP-A 62-115035, 4-152125, 4-284211, 4-298310, 11-48271, etc. For the machine-direction stretching, for example, the speed of the film conveyor rollers is regulated so that the film winding speed could be higher than the film peeling speed whereby the film may be stretched. For the cross-direction stretching, the film is conveyed while held by a tenter on the sides thereof and the tenter width is gradually broadened, whereby the film can be stretched. After dried, the film may be stretched with a stretcher (preferably for monoaxial stretching with a long stretcher).

The draw ratio in stretching of the cellulose acylate film is preferably from 5% to 200%, more preferably from 10% to 100%, even more preferably from 20% to 50%.

In case where the cellulose acylate film is used as a protective film for a polarizing element, the transmission axis of the polarizing element must be in parallel to the in-plane slow axis of the resin film of the invention so as to prevent the light leakage in oblique directions to the polarizer. The transmission axis of the roll film-type polarizing element that is produced continuously is generally parallel to the cross direction of the roll film, and therefore, in continuously sticking the roll film-type polarizing element and a protective film comprising the roll film-type cellulose acylate film, the in-plane slow axis of the roll film-type protective film must be parallel to the cross direction of the film. Accordingly, the film is preferably stretched to a larger extent in the cross direction. The stretching treatment may be attained during the course of the film formation process, or the wound film may be unwound and stretched. In the production method of the invention, the film is stretched while it contains the residual solvent therein, and therefore the film is preferably stretched during the course of the film formation process.

[Drying]

Preferably, the production method for the cellulose acylate film includes a step of drying the cellulose acylate laminate film and a step of stretching the dried cellulose acylate laminate film at a temperature not lower than (Tg −10° C.), from the viewpoint of enhancing the retardation of the film.

For drying the dope on a metal support in production of the cellulose acylate film, generally employable is a method of applying hot air to the surface of the metal support (drum or belt), or that is, onto the surface of the web on the metal support; a method of applying hot air to the back of the drum or belt; or a back side liquid heat transfer method that comprises contacting a temperature-controlled liquid with the opposite side of the dope-cast surface of the belt or drum, or that is, the back of the belt or drum to thereby heat the belt or drum by heat transmission to control the surface temperature thereof. Preferred is the backside liquid heat transfer method. The surface temperature of the metal support before the dope is cast thereon may be any degree so far as it is not higher than the boiling point of the solvent used in the dope. However, for promoting the drying or for making the dope lose its flowability on the metal support, preferably, the temperature is set to be lower by from 1 to 10° C. than the boiling point of the solvent having the lowest boiling point of all the solvents in the dope. In case where the cast dope is peeled off after cooled but not dried, then this shall not apply thereto.

(Peeling)

The production method for the cellulose acylate film preferably includes a step of peeling the dope film from the metal support. The peeling method in the cellulose acylate film production method is not specifically defined. Any known method is employable here for enhancing the peelability of the film.

For controlling the thickness of the film, the solid concentration in the dope, the slit gap of the die nozzle, the extrusion pressure from the die, and the metal support speed may be suitably regulated so that the formed film could have a desired thickness.

Produced in the manner as above, the length of the cellulose acylate film is preferably from 100 to 10000 m per roll, more preferably from 50 to 7000 m, even more preferably from 1000 to 6000 m. In winding the film, preferably, at least one edge thereof is knurled, and the knurling width is preferably from 3 mm to 50 mm, more preferably from 5 mm to 30 mm, and the knurling height is preferably from 0.5 to 500 μm, more preferably from 1 to 200 μm. This may be one-way or double-way knurling.

In general, in large-panel display devices, contrast reduction and color shift may be remarkable in oblique directions; and therefore the cellulose acylate film is especially suitable for use in large-panel display devices. In case where the film of the invention is used as an optical compensatory film for large-panel liquid crystal display devices, for example, the film is shaped to have a width of at least 1470 mm. The polarizer protective film of the invention includes not only film sheets cut to have a size that may be directly incorporated in liquid crystal display devices but also long films continuously produced and rolled up into rolls. The polarizer protective film of the latter embodiment is stored and transported in the rolled form, and is cut into a desired size when it is actually incorporated into a liquid crystal display device or when it is stuck to a polarizing element or the like. The long film may be stuck to a polarizing element formed of a long polyvinyl alcohol film directly as they are, and then when this is actually incorporated into a liquid crystal display device, it may be cut into a desired size. One embodiment of the long optical compensatory film rolled up into a roll may have a length of 2500 m/roll or more.

2. Active Energy Ray-Curable Layer

The polarizer protective film of the invention is characterized by having the active energy ray-curable layer laminated on the cellulose acylate film. In this description, the active energy ray-curable layer means a layer that contains a resin capable of being cured by active energy rays, in which the resin is cured by active energy rays.

The active energy ray-curable layer is described below.

<2-1: Composition of Active Energy Ray-Curable Layer>

In the polarizer protective film of the invention, the above-mentioned hindered amine compound may be or may not be contained in the active energy ray-curable layer. Above all, preferably, the hindered amine compound is contained in the active energy ray-curable layer. However, in such a case, in producing the polarizer protective film of the invention, the hindered amine compound may not be added directly to the active energy ray-curable layer, or that is, it is enough that the hindered amine compound is contained in the active energy ray-curable layer in such a manner that the hindered amine compound added to the cellulose acylate film moves to the active energy ray-curable layer and, as a result, the active energy ray-curable layer can contain the compound.

Concretely, it is desirable that the hindered amine compound is contained in the active energy ray-curable layer in an amount of from 0.001 to 1% by mass relative to the resin constituting the active energy ray-curable layer, more preferably from 0.005 to 0.5% by mass, even more preferably from 0.01 to 0.1% by mass.

Any other additives not contradictory to the scope and the sprit of the invention may be added to the active energy ray-curable layer.

<2-2: Type of Active Energy Ray-Curable Layer>

The active energy ray-curable layer in the polarizer protective film of the invention preferably has the functions of front scattering, antiglaring, gas barrier, lubrication, static charge prevention, undercoating, hard coat, antireflection, protection, etc. Specifically, the active energy ray-curable layer is preferably a functional layer such as a front scattering layer, an antiglare layer, a gas barrier layer, a lubricant layer, an antistatic layer, a hard coat layer, an antireflection layer, a protective layer or the like.

More preferably, the active energy ray-curable layer is an antireflection layer or a hard coat layer, even more preferably a hard coat layer.

Also preferably, the above functional layer is used in one and the same layer as mutually complexed therein with the antireflection layer in the other antireflection film than the active energy ray-curable layer, or with the optically anisotropic layer or the like in the other viewing angle compensatory film, etc.

Preferably, the active energy ray-curable layer is provided on at least one surface of the polarizer protective film of the invention. In case where the polarizer protective film of the invention is combined with a polarizing element to construct a polarizer, the active energy ray-curable layer may be provided on any one side of the polarizer element side or the side opposite to the polarizer element side (on the side nearer to air side), or on both sides thereof.

The functional layer serving as the active energy ray-curable layer in the invention is described below.

The polarizer protective film of the invention is characterized by having at least one active energy ray-curable layer on the cellulose acylate film therein. The polarizer protective film of the invention may have various functional layers mentioned below that are curable with active energy rays, and may further have any other various functional layers to be mentioned below that are not curable with active energy rays. The polarizer protective film of the invention may have one active energy ray-curable layer or may have two or more active energy ray-curable layers. Those plural active energy ray-curable layers, if any, may be the same or different.

(1) Hard Coat Layer

For enhancing the mechanical strength such as the abrasion resistance of the polarizer protective film, preferably, a hard coat layer of the above-mentioned active energy ray-curable layer is formed on the surface of the cellulose acylate film.

Preferably, the thickness of the hard coat layer is from 0.2 to 100 µm, more preferably from 0.5 to 50 µm, even more preferably from 1 to 20 µm.

The strength of the hard coating layer is preferably H or more, more preferably 2H or more, most preferably 3H or more, by a pencil hardness test in accordance with JIS K5400. Further, in a taber test according to JIS K5400, the hard coating layer more preferably has a smaller abrasion.

Compounds having an unsaturated ethylenic group and compounds having a ring opening polymerizable group can be used as materials for the hard coating layer, and the compounds may be used singly or in combination.

Preferred examples of the compounds having the unsaturated ethylenic groups include polyol polyacrylates such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether and diacrylate of hexanediol diglycidyl ether; and urethane acrylates prepared by a reaction of a polyisocyanate and a hydroxyl-containing acrylate such as hydroxyethyl acrylate.

Examples of commercially available compounds having the unsaturated ethylenic groups include EB-600, EB-40, EB-140, EB-1150, EB-1290K, IRR214, EB-2220, TMPTA, and TMPTMA available from Daicel ucb, and UV-6300 and UV-1700B available from Nippon Synthetic Chemical Industry Co., Ltd.

Preferred examples of the compounds having a ring opening polymerizable group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ethers of cresol novolac resins, and polyglycidyl ethers of phenol novolac resins; alicyclic epoxys such as CELOXIDE 2021P, CELOXIDE 2081, EPOLEAD GT-301, EPOLEAD GT-401, and EHPE3150CE available from Daicel Chemical Industries, Ltd., and polycyclohexyl epoxymethyl ether of phenol novolac resins; oxetanes such as OXT-121, OXT-221, OX-SQ, and PNOX-1009 available from Toagosei Co., Ltd. Further, polymers of glycidyl (meth)acrylate, and copolymers of glycidyl (meth)acrylate and a monomer copolymerizable there with may be used for the hard coating layer.

It is preferred that fine particles of oxides of silicon, titanium, zirconium, aluminum, etc., crosslinked particles of polyethylenes, polystyrenes, poly(meth)acrylic esters, polydimethylsiloxanes, etc., and organic crosslinked fine particles such as crosslinked rubber particles of SBR, NBR, etc. are added to the hard coating layer to reduce hardening shrinkage of the hard coating layer, increase the adhesion to the substrate, providing optical diffusiveness, and reduce curling of the hard coating product of the invention. The average particle size of these crosslinked fine particles is preferably 1 to 20,000 nm. The shape of the crosslinked fine particles is not particularly limited, and may be a spherical shape, rod-like shape, needle-like shape, tabular shape, etc. The amount of the fine particles is preferably such that the fine particle content of the hardened hard coating layer is 60% or less by volume. The fine particle content is more preferably 40% or less by volume.

In the case of adding the above described inorganic fine particles, which are poor in affinity for binder polymers generally, a surface treatment is preferably carried out using a surface treatment agent having a metal such as silicon, aluminum, or titanium, and a functional group such as an alkoxide group, a carboxylic acid group, a sulfonic acid group, or a phosphonic acid group.

Preferably, the hard coat layer is formed through crosslinking reaction or polymerization reaction of the curable compound therein under light and/or heat. The curable functional group is preferably a photocurable functional group.

Further, a hydrolyzable functional group-containing organic metal compound may be used in the layer. As the hydrolyzable functional group-containing organic metal compound, preferred is an organic alkoxysilyl compound.

In addition, a polymerization initiator and a leveling agent may be added to the hard coat layer, for which employable are any known compounds.

Regarding the concrete constitutive composition of the hard coat layer, for example, preferably usable herein are those described in JP-A 2002-144913, 2000-9908, WO0/46617, etc.

(2) Antireflection Layer

In the polarizer protective film of the invention, the active energy ray-curable layer formed on the surface of the cellulose acylate layer may serve as an antireflection layer.

The antireflection layer may be a film with a reflectivity of about 1.5% composed of a single layer of a low refractive material such as a fluorine polymer, or a film with a reflectivity of about 1% utilizing interference of thin layers. In the invention, it is preferred that a low refractive layer and at least one layer having a refractive index higher than that of the low refractive layer (a high refractive layer or an middle refractive layer) are stacked on a transparent substrate. Further, also antireflection films described in Nitto Giho, Vol. 38, No. 1, May 2000, Page 26 to 28, JP-A-2002-301783, etc. may be preferably used in the invention.

The refractive indexes of the layers satisfy the following relations.

Refractive index of high refractive layer>Refractive index of middle refractive layer>Refractive index of transparent substrate>Refractive index of low refractive layer The transparent substrate used for the antireflection film may be preferably the above mentioned transparent polymer film for the protective film to a polarizer.

The refractive index of the low refractive layer is preferably 1.20 to 1.55, more preferably 1.30 to 1.50. It is preferred that the low refractive layer is used as the outermost layer having an excoriation resistance and antifouling property. It is also preferred that a silicone-containing compound or a fluorine-containing compound, etc. is used for improving the slipping property of the surface to increase the excoriation resistance.

For example, compounds described in JP-A-9-222503, Paragraph 0018 to 0026, JP-A-11-38202, Paragraph 0019 to 0030, JP-A-2001-40284, Paragraph 0027 to 0028, JP-A-2000-284102, etc. can be preferably used as the fluorine-containing compound.

The silicone-containing compound preferably has a polysiloxane structure. Reactive silicones such as SILAPLANE available from Chisso Corporation and polysiloxanes having silanol end groups described in JP-A-11-258403, etc. can be used as the compound. An organic metal compound such as a silane coupling agent and a silane coupling agent having a particular fluorine-containing hydrocarbon group may be hardened by a condensation reaction in the presence of a catalyst, as described in JP-A-58-142958, JP-A-58-147483, JP-A-58-147484, JP-A-9-157582, JP-A-11-106704, JP-A-2000-117902, JP-A-2001-48590, JP-A-2002-53804, etc.

The low refractive layer may preferably contain another additive such as a filler (e.g. low refractive inorganic compound having an average primary particle size of 1 to 150 nm composed of silicon dioxide (silica) or a fluorine-containing compound (magnesium fluoride, calcium fluoride, barium fluoride, etc.), a fine organic particle described in JP-A-11-3820, Paragraph 0020 to 0038), a silane coupling agent, a slipping agent, or a surfactant.

The low refractive layer may be formed by a gas phase method such as a vacuum deposition method, a sputtering method, an ion plating method, or a plasma CVD method, and is preferably formed by a coating method advantageous in low costs. Preferred examples of the coating methods include dip coating methods, air-knife coating methods, curtain coating methods, roller coating methods, wire bar coating methods, gravure coating methods, and microgravure coating methods.

The thickness of the low refractive layer is preferably 30 to 200 nm, more preferably 50 to 150 nm, most preferably 60 to 120 nm.

The middle refractive layer and the high refractive layer are preferably such that high refractive inorganic compound ultrafine particles with an average particle size of 100 nm or less are dispersed in a matrix material. The high refractive inorganic compound fine particles are preferably composed of an inorganic compound having a refractive index of 1.65 or more such as an oxide of Ti, Zn, Sb, Sn, Zr, Ce, Ta, La, In, etc. or a multiple oxide containing the metal atom.

The ultrafine particles may be used such that the particle surfaces are treated with a surface treatment agent such as a silane coupling agent described in JP-A-11-295503, JP-A-11-153703, JP-A-2000-9908, etc., or an anionic compound or organic metal coupling agent described in JP-A-2001-310432, etc., such that a core-shell structure is formed by using high refractive particles as cores as described in JP-A-2001-166104, or such that a particular dispersant is used in combination as described in JP-A-11-153703, U.S. Pat. No. 6,210,858B1, JP-A-2002-2776069, etc.

The matrix material may be a known thermoplastic resin or hardening resin coating, etc., and may be a polyfunctional material described in JP-A-2000-47004, JP-A-2001-315242, JP-A-2001-31871, JP-A-2001-296401, etc. or a hardening film derived from a metal alkoxide composition described in JP-A-2001-293818, etc.

The refractive index of the high refractive layer is preferably 1.70 to 2.20. The thickness of the high refractive layer is preferably 5 nm to 10 μm, more preferably 10 nm to 1 μm.

The refractive index of the middle refractive layer is controlled at a value between those of the low refractive layer and the high refractive layer. The refractive index of the middle refractive layer is preferably 1.50 to 1.70.

The haze of the antireflection film is preferably 5% or less, more preferably 3% or less. The strength of the film is preferably H or more, more preferably 2H or more, most preferably 3H or more, in a pencil hardness test in accordance with JIS K5400.

(3) Front Scattering Layer

In the polarizer protective film of the invention, the active energy ray-curable layer formed on the surface of the cellulose acylate layer may serve as a front scattering layer.

The forward scattering layer is used for improving the viewing angle properties (the hue and brightness distribution) in the directions of up, down, left, and right, of the liquid crystal display device containing the polarizer according to the invention. In the invention, the forward scattering layer is preferably composed of fine particles with different refractive indexes dispersed in a binder. For example, the forward scattering layer may have such a structure that the forward scattering coefficient is particularly controlled as described in JP-A-11-38208, that relative refractive indexes of a transparent resin and fine particles are particularly controlled as described in JP-A-2000-199809, or that the haze is controlled at 40% more as described in JP-A-2002-107512. Further, it is preferred that the polarizer is used in combination with LUMISTY described in Sumitomo Chemical Co., Ltd., Technical Report, Optical functional film, page 31 to 39 to control the haze viewing angle properties.

(4) Antiglare Layer

In the polarizer protective film of the invention, the active energy ray-curable layer formed on the surface of the cellulose acylate layer may serve as an antiglare layer.

The antiglare (antidazzle) layer is used for scattering a reflected light to prevent glare. The antiglare function is obtained by forming concavity and convexity on the outermost surface of the liquid crystal display device. The haze of the optical film having the antiglare function is preferably 3 to 30%, more preferably 5 to 20%, most preferably 7 to 20%.

The concavity and convexity is preferably formed on the film surface by a method of adding fine particles (JP-A-2000-271878, etc.), a method of adding a small amount (0.1 to 50% by mass) of relatively large particles having a size of 0.05 to 2 μm (JP-A-2000-281410, JP-A-2000-95893, JP-A-2001-100004, JP-A-2001-281407, etc.), or a method of physically transferring the concavity and convexity to the film surface (such as a embossing method described in JP-A-63-278839, JP-A-11-183710, JP-A-2000-275401, etc.).

<2-3: Method for Formation of Active Energy Ray-Curable Layer>

The method for forming the active energy ray-curable layer is not specifically defined, for which any known method is employable here. Above all, preferably, the active energy ray-curable layer is formed by dissolving the material to form the layer in an organic solvent followed by applying the resulting solution onto the cellulose acylate film.

As the organic solvent, herein usable is any known organic solvent either singly or as combined. Above all, preferred are ketone solvent from the viewpoint of the ability thereof to dissolve the above-mentioned hindered amine compound.

The ketone solvents include, for example, MiBK (methyl isobutyl ketone), MEK (methyl ethyl ketone), methyl n-propyl ketone, methyl n-butyl ketone, diethyl ketone, cyclohexanone, etc. Of those, preferred are MiBK and MEK; and more preferred is use of a mixture of MiBK and MEK. In case where plural solvents are used as mixed, preferably, their ratio is so controlled that the resulting mixed solvent can dissolve the above-mentioned hindered amine compound.

For example, in case where MiBK and MEK are used as combined, preferably, the ratio of MiBK/MEK is from 90/10 to 10/90 (by volume).

The concrete method of forming the active energy ray-curable layer by coating is not specifically defined, for which, for example, preferably employed is a microgravure coating method. The traveling speed in coating is not also specifically defined, and for example, the traveling speed in coating is preferably from 5 to 100 m/min. No specific limitation is given to the drying mode after coating, and preferably, the drying temperature is from 40 to 120° C. and the drying time is from 30 to 180 seconds.

For curing the active energy ray-curable layer, more preferably used is an active energy ray of radiation, gamma ray, alpha ray, electron beam, UV ray or the like, and in consideration of the safety and the producibility, even more preferred is use of electron beam or UV ray. In case where the layer is cured under heat, the heating temperature is preferably not higher than 140° C. in consideration of the heat resistance of the plastic itself, more preferably not higher than 100° C.

When the layer is irradiated with an active energy ray, preferably, the system is purged with nitrogen (to have an oxygen concentration of at most 0.5%). The strength of the active energy ray is not also specifically defined. For example, when the layer is irradiated with UV ray, preferably, the UV irradiation is at an illuminance of from 100 to 1000 mW/cm$^2$ and at a radiation dose of from 50 to 500 mJ/cm$^2$.

When a solution prepared by dissolving the material of forming the active energy ray-curable layer in an organic solvent is applied onto the cellulose acylate film, preferably, the solution is applied to the side of the cellulose acylate film that was the air-facing side thereof during its production (or that is, the side opposite to the support-facing side of the film). When a cellulose acylate solution prepared by dissolving cellulose acylate in a mixed solvent of methylene chloride and alcohol is cast onto a support and dried thereon, the air interface side of the film is dried while the proportion of methylene chloride therein is high, and therefore has a high mechanical strength. Accordingly, by forming the active energy ray-curable layer on the air-facing side of the cellulose acylate film, there can be obtained a laminate film free from a trouble of peeling between the cellulose acylate film and the active energy ray-curable layer.

Preferably in the invention, the cellulose acylate film contains a plasticizer, and in such a case, preferably, the active energy ray-curable layer is formed on the side of the cellulose acylate film in which the plasticizer concentration in the cellulose acylate therein is lower from the viewpoint of further enhancing the peeling resistance between the cellulose acylate film and the active energy ray-curable layer.

[Polarizer]

The invention also relates to a polarizer comprising at least one polarizer protective film of the invention.

Preferably, the polarizer of the invention comprises a polarizing element and the film of the invention on one face of the polarizer. The embodiment of the polarizer of the invention may include not only polarizers in the form of film sheets cut to have a size that may be directly incorporated in liquid crystal display devices but also polarizers in the form of long films continuously produced and rolled up into rolls (for example having a length of at least 2500 m/roll or at least 3900 m/roll). For use in large-panel liquid crystal display devices, the width of the polarizer is preferably at least 1470 mm as so mentioned in the above.

The concrete constitution of the polarizer of the invention is not specifically defined, for which, therefore, any known constitution is employable. For example, the constitution of FIG. 6 in JP-A 2008-262161 is employable.

(Cross Transmittance Change)

In this description, the cross transmittance CT of the polarizer is measured using UV3100PC (by Shimadzu). For the measurement, one sample was analyzed ten times all at 410 nm, and the data were averaged.

The polarizer durability test can be carried out as follows: The polarizer is stuck to a glass base with an adhesive, and two and the same samples thereof are prepared (about 5 cm×5 cm each). In single plate cross transmittance measurement, the sample is so set that its film side could face the light source, and analyzed in that condition. Two these samples are analyzed, and the data are averaged to give the cross transmittance of the polarizer of the invention.

Preferably, in the polarizer durability test, the polarizer of the invention has a smaller change.

Preferably, the single plate cross transmittance change (%) of the polarizer of the invention, when kept at 60° C. and at a relative humidity of 95% for 1000 hours, is at most 1.40%.

The single plate cross transmittance change (%), when kept at 60° C. and at a relative humidity of 95% for 1000 hours, is more preferably at most 1.00%, even more preferably at most 0.50%. In this, the change means the value computed by subtracting the measured value before the test from the measured value after the test.

When the polarizer satisfies the above-mentioned range of cross transmittance change, the polarizer is favorable as capable of securing the safety in long-term use or during storage thereof in high-temperature high-humidity environments.

[Liquid Crystal Display Device]

The invention also relates to a liquid crystal display device comprising the polarizer protective film or the invention or the polarizer of the invention.

The liquid crystal display device of the invention is a liquid crystal display device, preferably an IPS, OCB or VA-mode liquid crystal display device comprising a liquid crystal cell and a pair of polarizers arranged on both sides of the liquid crystal cell, in which at least one of the polarizers is the polarizer of the invention.

The concrete constitution of the liquid crystal display device of the invention is not specifically defined, for which, therefore, any known constitution is employable. The constitution of FIG. 2 in JP-A 2008-262161 is also preferably employable herein.

EXAMPLES

The invention is described more concretely with reference to the following Examples. In the following Examples, the materials, the reagents and the substances used, their amount and ratio, the details of the treatment and the treatment process may be suitably modified or changed not overstepping the sprit and the scope of the invention. Accordingly, the invention should not be limitatively interpreted by the Examples mentioned below.

Example 101

(1) Formation of Cellulose Acylate Film
<Preparation of Cellulose Acylate>

Cellulose acylate having a degree of acetyl substitution of 2.87 was prepared. As a catalyst, sulfuric acid (7.8 parts by mass relative to 100 parts by mass of cellulose) was added to cellulose, and a carboxylic acid to be the starting material for the acyl substituent was added thereto for acylation at 40° C. After the acylation, the system was ripened at 40° C. Further, the cellulose acylate was washed with acetone to remove the low-molecular fraction therefrom.

<Preparation of Surface Layer Dope 101>
(Preparation of Cellulose Acylate Solution)

The following composition was put into a mixing tank and stirred to dissolve the ingredients, thereby preparing a cellulose acylate solution 1.

| Composition of Cellulose Acylate Solution 1 | |
|---|---|
| Cellulose acetate having a degree of acetyl substitution of 2.87 and a degree of polymerization of 370 | 100.0 mas. pts. |
| Triphenyl phosphate | 8.0 mas. pts. |
| Phenylbiphenyl phosphate | 4.0 mas. pts. |
| Methylene chloride (first solvent) | 353.9 mas. pts. |
| Methanol (second solvent) | 89.6 mas. pts. |
| N-butanol (third solvent) | 4.5 mas. pts. |

(Preparation of Matting Agent Solution 2)

The following composition was put into a mixing tank and stirred to dissolve the ingredients, thereby preparing a matting agent solution 2.

| Composition of Matting Agent Solution 2 | |
|---|---|
| Silica particles having a mean particle size of 20 nm (AEROSIL R972, by Nippon Aerosil) | 2.0 mas. pts. |
| Methylene chloride (first solvent) | 69.3 mas. pts. |
| Methanol (second solvent) | 17.5 mas. pts. |
| N-butanol (third solvent) Cellulose acylate solution 1 | 0.9 mas. pts. |

(Preparation of Organic Acid Solution 3)

The following composition was put into a mixing tank and stirred under heat to dissolve the ingredients, thereby preparing an organic acid solution 3.

| Composition of Organic Acid Solution 3 | |
|---|---|
| FLAMESAB NOR 116FF (by BASF) | 10.0 mas. pts. |
| UV absorbent C mentioned below | 10.0 mas. pts. |
| Methylene chloride (first solvent) | 61.0 mas. pts. |
| Methanol (second solvent) | 15.4 mas. pts. |
| N-butanol (third solvent) | 0.8 mas. pts. |
| Cellulose acylate solution 1 | 12.8 mas. pts. |

UV Absorbent C

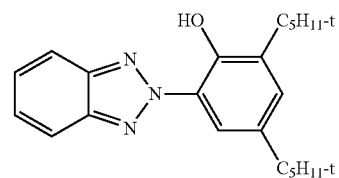

1.3 parts by mass of the matting agent solution 2 and 3.4 parts by mass of the organic acid solution 3 were, both after filtered separately, mixed using an in-line mixer, and 95.3 parts by mass of the cellulose acylate solution 1 was added thereto and further mixed with the in-line mixer to prepare a surface layer solution 101.

<Preparation of Substrate Layer Dope 101>
(Preparation of Cellulose Acylate Solution)

The following composition was put into a mixing tank and stirred to dissolve the ingredients, thereby preparing a substrate layer dope.

| Composition of Cellulose Acylate Solution 2 | |
|---|---|
| Cellulose acetate having a degree of acetyl substitution of 2.87 and a degree of polymerization of 370 | 100.0 mas. pts. |
| Plasticizer A (triphenyl phosphate) | 8.0 mas. pts. |
| Plasticizer B (biphenyldiphenyl phosphate) | 4.0 mas. pts. |
| UV absorbent C | 2.0 mas. pts. |
| FLAMESAB NOR 116FF (by BASF) | 2.0 mas. pts. |
| Poem K-37V (by Riken Vitamin) | 3.0 mas. pts. |
| Methylene chloride (first solvent) | 297.7 mas. pts. |
| Methanol (second solvent) | 75.4 mas. pts. |
| N-butanol (third solvent) | 3.8 mas. pts. |

<Casting>

Using a drum casting apparatus, three layers of the previously-prepared dope (substrate layer dope) and the surface layer dope on both sides of the substrate layer dope were simultaneously cast onto a stainless casting support (support temperature, −9° C.), each uniformly via the casting mouth thereonto. The film was peeled away while the residual solvent amount in the dope of each layer was about 70% by mass; and both sides of the film in the cross direction were fixed with a pin tenter, and while the residual solvent amount therein was from 3 to 5% by mass, the film was dried with stretching it by 1.28 times in the cross direction. Subsequently, the film was conveyed between rolls in a heat treatment unit and was further dried therein, thereby giving a cellulose acylate film of Example 1. The thickness of the thus-obtained cellulose acylate film was 60 μm, and the width thereof was 1480 mm.

(2) Formation of Active Energy Ray-Curable Layer
<Preparation of Hard Coat Layer Coating Liquid (HC-1)>

A composition comprising the constitutive ingredients as in Table 1 was prepared, and filtered through a polypropylene filter having a pore size of 30 μm to prepare a hard coat layer coating liquid.

TABLE 1

| | Coating Liquid HC-1 |
|---|---|
| Binder | PET-30/22.9 mas. pts. |
| | Biscoat 360/22.9 mas. pts. |
| Polymerization Initiator | Irgacure 127/1.5 mas. pts. |
| Optical Diffusive Particles | 8-μm crosslinked acryl/styrene particles 30% MiBK dispersion/mas. pts. |
| Solvent | MiBK/19.2 mas. pts. |
| | MEK/25 mas. pts. |
| Others | — |
| Leveling Agent | FP-13/0.1 mas. pts. |

The compounds used above are described below.
PET-30: Mixture of pentaerythritol and pentaerythritol tetraacrylate (by Nippon Kayaku)
Biscoat 360: Trimethylolpropane PO-modified triacrylate (by Osaka Organic Chemistry)
8-μm crosslinked acryl/styrene particles (30%): MiBK dispersion prepared by dispersing the particles having a mean particle size of 8.0 μm (by Sekisui Chemical) in a
Polytron disperser at 10000 rpm for 20 minutes.
Irgacure 127: Polymerization initiator (by Ciba Specialty Chemicals)
FP-13: Fluorine-containing surface modifier described in JP-A 2009-063983, [0341] (dissolved in MEK to be 10 mas. % solution and used here.)

In the above Table 1, MiBK means methyl isobutyl ketone, and MEK means methyl ethyl ketone, and these are both ketone solvents.

<Formation of Hard Coat Layer>

Onto the surface of the cellulose acylate film thus formed in the above, which had been kept in contact with the support in film production (hereinafter this is referred to as support-side surface), the hard coat layer coating liquid (HC-1) was applied according to a microgravure coating method at a traveling speed of 30 m/min. After dried at 60° C. for 150 seconds, the coating layer was cured by irradiation with UV rays at an illuminance of 400 mW/cm² and at an irradiation dose of 150 mJ/cm² using a 160 W/cm air-cooled metal halide lamp (by Eye Graphics), with purging with nitrogen (oxygen concentration, at most 0.5%), thereby producing a hard coat layer.

Thus produced, the hard coat layer-having polarizer protective film is a polarizer protective film of Example 101.

(3) Production of Polarizer
[Saponification Treatment of Polarizer Protective Film]

The polarizer protective film of Example 101 produced in the above was dipped in an aqueous solution of 2.3 mol/L sodium hydroxide at 55° C. for 3 minutes. This was washed in a water-washing bath at room temperature, and then neutralized with 0.05 mol/L sulfuric acid at 30° C. Again this was washed with a water-washing bath at room temperature and then dried with hot air at 100° C. Accordingly, the surface of the polarizer protective film of Example 101 was saponified.

[Production of Polarizer]

A stretched polyvinyl alcohol film was made to adsorb iodine to prepare a polarizing element.

Using a polyvinyl alcohol adhesive, the saponified polarizer protective film of Example 101 was stuck to one side of the polarizing element. A commercially-available cellulose triacetate film (Fujitac TD80UF by FUJIFILM) was saponified in the same manner as above, and using a polyvinyl alcohol adhesive, the thus-saponified cellulose triacetate film was stuck to the other side of the polarizing element to which the polarizer protective film of Example 101 had been stuck.

In this, the polarizing element and the polarizer protective film of Example 101 were so arranged that the transmission axis of the former could be perpendicular to the slow axis of the latter. In addition, the polarizing element and the commercially-available triacetate film were also so arranged that the transmission axis of the former could be perpendicular to the slow axis of the latter.

In that manner, a polarizer of Example 101 was produced.

Examples 102 to 114, and Comparative Examples 201 to 204

[Production of Polarizer Protective Films of Examples 102 to 114 and Comparative Examples 201 to 204]

Polarizer protective films of Examples 102 to 114 and Comparative Examples 201 to 204 were produced in the same manner as in Example 101, except that the type and the amount of the antioxidant, the type and the amount of the plasticizer, the type and the amount of the organic acid, and the thickness of the film were changed as in Tables 2 to 4. Specifically, in the polarizer protective films of Examples 102 to 114 and Comparative Examples 201 to 204, the active energy ray-curable layer was formed in the same manner as in Example 101.

In the following Table 2 to Table 4, the amount of the antioxidant, the plasticizer and the organic acid is in terms of part by mass relative to 100 parts by mass of the cellulose acylate resin. In the following Tables 2 to 4, sucrose benzoate is Daiichi Kogyo Chemical's Monopet (trade name) SB. In the following Tables 2 to 4, sucrose acetate isobutyrate is Eastman Chemical's SAIB100. In the following Tables 2 to 4, TINUVIN 770DF used in Comparative Examples 3 and 4 is the compound D-1 in JP-A 2006-104374 and has the following structure.

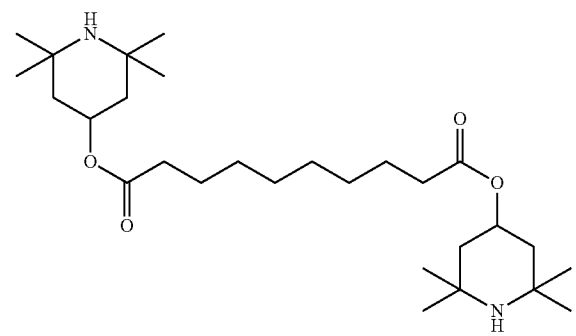

TABLE 2

Air-Side Skin Layer

| | Plasticizer 1 | | Plasticizer 2 | | Antioxidant | | Organic Acid | | Film Thickness (μm) |
|---|---|---|---|---|---|---|---|---|---|
| | type | amount added (a) | type | amount added (a) | type | amount added (a) | type | amount added (a) | |
| Example 101 | triphenyl phosphate | 8 | biphenyldiphenyl phosphate | 4 | FLAMESTAB NOR 116FF | 2 | Poem K-37V | 2 | 3 |
| Example 102 | triphenyl phosphate | 8 | biphenyldiphenyl phosphate | 4 | FLAMESTAB NOR 116FF | 1 | Poem K-37V | 2 | 3 |
| Example 103 | triphenyl phosphate | 8 | biphenyldiphenyl phosphate | 4 | FLAMESTAB NOR 116FF | 0.5 | Poem K-37V | 2 | 3 |
| Example 104 | triphenyl phosphate | 8 | biphenyldiphenyl phosphate | 4 | FLAMESTAB NOR 116FF | 0.1 | Poem K-37V | 2 | 3 |
| Example 105 | triphenyl phosphate | 8 | biphenyldiphenyl phosphate | 4 | FLAMESTAB NOR 116FF | 10 | Poem K-37V | 2 | 3 |
| Example 106 | triphenyl phosphate | 8 | biphenyldiphenyl phosphate | 4 | FLAMESTAB NOR 116FF | 10 | — | 0 | 6 |
| Example 107 | triphenyl phosphate | 8 | biphenyldiphenyl phosphate | 4 | TINUVIN 152 | 2 | Poem K-37V | 2 | 3 |
| Example 108 | triphenyl phosphate | 8 | biphenyldiphenyl phosphate | 4 | TINUVIN 123 | 2 | Poem K-37V | 2 | 3 |
| Example 109 | sucrose benzoate | 11 | — | 0 | FLAMESTAB NOR 116FF | 2 | Poem K-37V | 2 | 3 |
| Example 110 | sucrose benzoate | 11 | sucrose acetate isobutyrate | 3 | FLAMESTAB NOR 116FF | 2 | Poem K-37V | 2 | 3 |
| Example 111 | triphenyl phosphate | 8 | biphenyldiphenyl phosphate | 4 | FLAMESTAB NOR 116FF | 2 | — | 0 | 3 |
| Example 112 | sucrose benzoate | 11 | — | 0 | FLAMESTAB NOR 116FF | 2 | — | 0 | 3 |
| Example 113 | sucrose benzoate | 11 | sucrose acetate isobutyrate | 3 | FLAMESTAB NOR 116FF | 2 | — | 0 | 3 |
| Example 114 | sucrose benzoate | 11 | — | 0 | FLAMESTAB NOR 116FF | 10 | — | 0 | 6 |
| Comparative Example 201 | triphenyl phosphate | 8 | biphenyldiphenyl phosphate | 4 | — | 0 | Poem K-37V | 2 | 3 |
| Comparative Example 202 | triphenyl phosphate | 8 | biphenyldiphenyl phosphate | 4 | — | 0 | — | 0 | 3 |
| Comparative Example 203 | triphenyl phosphate | 8 | biphenyldiphenyl phosphate | 4 | TINUVIN 770DF | 2 | Poem K-37V | 2 | 3 |
| Comparative Example 204 | triphenyl phosphate | 8 | biphenyldiphenyl phosphate | 4 | TINUVIN 770DF | 2 | — | 0 | 3 |

(a) Amount in terms of part by mass relative to 100 parts by mass of cellulose acylate.

TABLE 3

Core Layer

| | Plasticizer 1 | | Plasticizer 2 | | Antioxidant | | Organic Acid | | Film Thickness (μm) |
|---|---|---|---|---|---|---|---|---|---|
| | type | amount added (a) | type | amount added (a) | type | amount added (a) | type | amount added (a) | |
| Example 101 | triphenyl phosphate | 8 | biphenyldiphenyl phosphate | 4 | FLAMESTAB NOR 116FF | 2 | Poem K-37V | 2 | 54 |
| Example 102 | triphenyl phosphate | 8 | biphenyldiphenyl phosphate | 4 | FLAMESTAB NOR 116FF | 1 | Poem K-37V | 2 | 54 |
| Example 103 | triphenyl phosphate | 8 | biphenyldiphenyl phosphate | 4 | FLAMESTAB NOR 116FF | 0.5 | Poem K-37V | 2 | 54 |
| Example 104 | triphenyl phosphate | 8 | biphenyldiphenyl phosphate | 4 | FLAMESTAB NOR 116FF | 0.1 | Poem K-37V | 2 | 54 |
| Example 105 | triphenyl phosphate | 8 | biphenyldiphenyl phosphate | 4 | FLAMESTAB NOR 116FF | 0 | Poem K-37V | 2 | 54 |
| Example 106 | triphenyl phosphate | 8 | biphenyldiphenyl phosphate | 4 | FLAMESTAB NOR 116FF | 0 | Poem K-37V | 0 | 48 |
| Example 107 | triphenyl phosphate | 8 | biphenyldiphenyl phosphate | 4 | TINUVIN 152 | 2 | Poem K-37V | 2 | 54 |
| Example 108 | triphenyl phosphate | 8 | biphenyldiphenyl phosphate | 4 | TINUVIN 123 | 2 | Poem K-37V | 2 | 54 |
| Example 109 | sucrose benzoate | 11 | — | 0 | FLAMESTAB NOR 116FF | 2 | Poem K-37V | 2 | 54 |
| Example 110 | sucrose benzoate | 11 | sucrose acetate isobutyrate | 3 | FLAMESTAB NOR 116FF | 2 | Poem K-37V | 2 | 54 |
| Example 111 | triphenyl phosphate | 8 | biphenyldiphenyl phosphate | 4 | FLAMESTAB NOR 116FF | 2 | — | 0 | 54 |
| Example 112 | sucrose benzoate | 11 | — | 0 | FLAMESTAB NOR 116FF | 2 | — | 0 | 54 |

TABLE 3-continued

| | Core Layer | | | | | | | | |
|---|---|---|---|---|---|---|---|---|---|
| | Plasticizer 1 | | Plasticizer 2 | | Antioxidant | | Organic Acid | | |
| | type | amount added (a) | type | amount added (a) | type | amount added (a) | type | amount added (a) | Film Thickness (μm) |
| Example 113 | sucrose benzoate | 11 | sucrose acetate isobutyrate | 3 | FLAMESTAB NOR 116FF | 2 | — | 0 | 54 |
| Example 114 | sucrose benzoate | 11 | — | 0 | FLAMESTAB NOR 116FF | 0 | — | 0 | 48 |
| Comparative Example 201 | triphenyl phosphate | 8 | biphenyldiphenyl phosphate | 4 | — | 0 | Poem K-37V | 2 | 54 |
| Comparative Example 202 | triphenyl phosphate | 8 | biphenyldiphenyl phosphate | 4 | — | 0 | — | 0 | 54 |
| Comparative Example 203 | triphenyl phosphate | 8 | biphenyldiphenyl phosphate | 4 | TINUVIN 770DF | 2 | Poem K-37V | 2 | 54 |
| Comparative Example 204 | triphenyl phosphate | 8 | biphenyldiphenyl phosphate | 4 | TINUVIN 770DF | 2 | — | 0 | 54 |

(a) Amount in terms of part by mass relative to 100 parts by mass of cellulose acylate.

TABLE 4

| | Support-Side Skin Layer | | | | | | | | |
|---|---|---|---|---|---|---|---|---|---|
| | Plasticizer 1 | | Plasticizer 2 | | Antioxidant | | Organic Acid | | |
| | type | amount added (a) | type | amount added (a) | type | amount added (a) | type | amount added (a) | Film Thickness (μm) |
| Example 101 | triphenyl phosphate | 8 | biphenyldiphenyl phosphate | 4 | FLAMESTAB NOR 116FF | 2 | Poem K-37V | 2 | 3 |
| Example 102 | triphenyl phosphate | 8 | biphenyldiphenyl phosphate | 4 | FLAMESTAB NOR 116FF | 1 | Poem K-37V | 2 | 3 |
| Example 103 | triphenyl phosphate | 8 | biphenyldiphenyl phosphate | 4 | FLAMESTAB NOR 116FF | 0.5 | Poem K-37V | 2 | 3 |
| Example 104 | triphenyl phosphate | 8 | biphenyldiphenyl phosphate | 4 | FLAMESTAB NOR 116FF | 0.1 | Poem K-37V | 2 | 3 |
| Example 105 | triphenyl phosphate | 8 | biphenyldiphenyl phosphate | 4 | FLAMESTAB NOR 116FF | 0 | Poem K-37V | 2 | 3 |
| Example 106 | triphenyl phosphate | 8 | biphenyldiphenyl phosphate | 4 | FLAMESTAB NOR 116FF | 0 | Poem K-37V | 20 | 6 |
| Example 107 | triphenyl phosphate | 8 | biphenyldiphenyl phosphate | 4 | TINUVIN 152 | 2 | Poem K-37V | 2 | 3 |
| Example 108 | triphenyl phosphate | 8 | biphenyldiphenyl phosphate | 4 | TINUVIN 123 | 2 | Poem K-37V | 2 | 3 |
| Example 109 | sucrose benzoate | 11 | — | 0 | FLAMESTAB NOR 116FF | 2 | Poem K-37V | 2 | 3 |
| Example 110 | sucrose benzoate | 11 | sucrose acetate isobutyrate | 3 | FLAMESTAB NOR 116FF | 2 | Poem K-37V | 2 | 3 |
| Example 111 | triphenyl phosphate | 8 | biphenyldiphenyl phosphate | 4 | FLAMESTAB NOR 116FF | 2 | — | 0 | 3 |
| Example 112 | sucrose benzoate | 11 | — | 0 | FLAMESTAB NOR 116FF | 2 | — | 0 | 3 |
| Example 113 | sucrose benzoate | 11 | sucrose acetate isobutyrate | 3 | FLAMESTAB NOR 116FF | 2 | — | 0 | 3 |
| Example 114 | sucrose benzoate | 11 | — | 0 | FLAMESTAB NOR 116FF | 0 | Organic Acid A | 20 | 6 |
| Comparative Example 201 | triphenyl phosphate | 8 | biphenyldiphenyl phosphate | 4 | — | 0 | Poem K-37V | 2 | 3 |
| Comparative Example 202 | triphenyl phosphate | 8 | biphenyldiphenyl phosphate | 4 | — | 0 | — | 0 | 3 |
| Comparative Example 203 | triphenyl phosphate | 8 | biphenyldiphenyl phosphate | 4 | TINUVIN 770DF | 2 | Poem K-37V | 2 | 3 |
| Comparative Example 204 | triphenyl phosphate | 8 | biphenyldiphenyl phosphate | 4 | TINUVIN 770DF | 2 | — | 0 | 3 |

(a) Amount in terms of part by mass relative to 100 parts by mass of cellulose acylate.

The organic acid A is Tokyo Chemical's 1-benzyl-5-phenylbarbituric acid, and its acid dissociation constant in a mixed solvent of tetrahydrofuran/water=6/4 by volume at 25° C. is 4.0.

[Saponification Treatment of Polarizer Protective Film and Production of Polarizer]

Also in the same manner as in Example 101, the polarizer protective films of Examples 102 to 114 and the polarizer protective films of Comparative Examples 201 to 204 were saponified, and the polarizers of Examples and Comparative Examples were produced.

[Evaluation]

<Evaluation of Adhesiveness>

The hard coat layer-having polarizer protective films of Examples and Comparative Examples produced in the above were irradiated with light, using Suga Test Instruments' Super Xenon Weather Meter SX75, in an environment at 60° C. and at a relative humidity of 50% for 100 hours.

Next, the hard coat layer-having polarizer protective films were conditioned at a temperature of 25° C. and at a relative humidity of 60% for 2 hours. Using a cutter knife, the hard coat layer-side surface of the film was cut at 11 lines vertically and at 11 lines horizontally to form 100 square cross-cuts in all; and Nitto Denko's polyester adhesive tape No. 31B was stuck to the thus-cut surface. After 30 minutes, the tape was rapidly peeled away in the vertical direction, and the number of the peeled cross-cuts was counted. The tested sample was evaluated according to the following four-rank standards. The same adhesiveness test was repeated three times for one sample, and the data were averaged.

A: No cross-cut peeled at all.
B: From 1 to 2 of 100 cross-cuts peeled.
C: From 3 to 10 of 100 cross-cuts peeled (acceptable level).
D: 11 or more of 100 cross-cuts peeled.

The obtained results are shown in Table 5 below.

(Evaluation of Polarizer Durability)

In the polarizers of Examples and Comparative Examples produced in the above, the cross transmittance of the polarizing element at a wavelength of 410 nm was measured according to the method described herein.

Subsequently, the polarizers were stored in an environment at 60° C. and at a relative humidity of 95% for 1000 hours, and then the cross transmittance of the polarizing element therein was measured according to the same method as above. The cross transmittance change before and after the storage was computed, and this is the polarizing element durability. The results are shown in Table 5 below. The relative humidity in the non-conditioned environment was within a range of from 0% to 20%.

TABLE 5

|  | Evaluation of Adhesiveness | Polarizing Element Durability/Cross Transmittance Change (%) 60° C. relative humidity 95% 1000 hours |
| --- | --- | --- |
| Example 101 | A | 1.01 |
| Example 102 | A | 1.00 |
| Example 103 | A | 1.04 |
| Example 104 | B | 1.05 |
| Example 105 | A | 1.02 |
| Example 106 | A | 0.82 |
| Example 107 | A | 1.00 |
| Example 108 | A | 1.02 |
| Example 109 | A | 0.34 |
| Example 110 | A | 0.36 |
| Example 111 | A | 1.42 |
| Example 112 | A | 0.45 |
| Example 113 | A | 0.43 |
| Example 114 | A | 0.24 |
| Comparative Example 201 | D | 1.02 |
| Comparative Example 202 | C | 1.43 |
| Comparative Example 203 | C | 1.47 |
| Comparative Example 204 | B | 1.88 |

From the results in the above Table 5, it is known that the polarizers comprising the polarizer protective film of the invention is free from polarizing element degradation after storage in high-temperature high-humidity environments. In addition, it is further known that the polarizer protective films of the invention are favorable since these are free from a trouble of peeling between the hard coat layer and the cellulose acylate film therein even when exposed to light for a long period of time.

In the polarizer protective films of the invention, it was confirmed that the hard coat layer contained the above-mentioned hindered amine compound in an amount of from 0.001 to 1.0% by mass relative to the resin constituting the hard coat layer.

Example 301

[Production of Liquid Crystal Display Device]

The viewers' side polarizer was peeled away from a commercially-available liquid crystal television (SONY's Bravia J5000), and the polarizer of the invention comprising the polarizer protective film of Example 101 was stuck thereto using an adhesive, in such a manner that the polarizer protective film of Example 101 could face the liquid crystal cell in the device. In this, the transmission axis of the viewers' side polarizer was set in the vertical direction. In addition, liquid crystal display devices of Comparative Examples were produced in the same manner as herein except that the polarizer protective film of Comparative Examples 201 to 204 was used. As compared with the liquid crystal display devices of Comparative Examples, the liquid crystal display device of the invention thus produced was good since the display performance thereof deteriorated little even when used in the outdoor environment under direct sunlight for a long period of time.

Example 401

[Formation of Cellulose Acylate Film 401]

<Preparation of Cellulose Acylate Solution>

The following composition was put into a mixing tank and stirred to dissolve the ingredients, thereby preparing a cellulose acylate solution.

(Composition of Cellulose Acylate Solution)

| | |
| --- | --- |
| Cellulose acetate having a degree of acetyl substitution of 2.85, produced from linter cotton | 100.0 mas. pts. |
| Plasticizer, triphenyl phosphate | 8.0 mas. pts. |
| Plasticizer, biphenyl phosphate | 4.0 mas. pts. |

-continued

| (Composition of Cellulose Acylate Solution) | |
|---|---|
| Methylene chloride (first solvent) | 402.0 mas. pts. |
| Methanol (second solvent) | 60.0 mas. pts. |

<Preparation of Matting Agent Solution>

The following composition was put into a mixing tank and stirred to dissolve the ingredients, thereby preparing a matting agent solution.

| (Composition of Matting Agent Solution) | |
|---|---|
| Silica particles having a mean particle size of 20 nm (AEROSIL R972, by Nippon Aerosil) | 2.0 mas. pts. |
| Methylene chloride (first solvent) | 75.0 mas. pts. |
| Methanol (second solvent) | 12.7 mas. pts. |
| Cellulose acylate solution | 10.3 mas. pts. |

<Preparation of UV Absorbent Solution>

The following composition was put into a mixing tank and stirred under heat to dissolve the ingredients, thereby preparing a UV absorbent solution.

| (Composition of UV Absorbent Solution) | |
|---|---|
| UV absorbent (C) | 15.0 mas. pts. |
| UV absorbent (D) | 5.0 mas. pts. |
| Methylene chloride (first solvent) | 58.4 mas. pts. |
| Methanol (second solvent) | 8.7 mas. pts. |
| Cellulose acylate solution | 12.8 mas. pts. |

97.1 parts by mass of the cellulose acylate solution, 1.3 parts by mass of the matting agent solution and 1.6 parts by mass of the UV absorbent solution were, all after filtered separately, mixed and cast using a band caster. The web having a residual solvent content of 30% by mass was peeled away from the support, and laterally stretched by 4%, using a tenter at 100° C. This was unclipped, and dried at 130° C. for 20 minutes to thereby produce a cellulose acylate film 401. The residual solvent content of the thus-produced cellulose acylate film was 0.2% by mass, and the thickness thereof was 60 μm.

Examples 402 to 412, and Comparative Examples 501 to 506

Cellulose acylate films 402 to 412 of Examples 402 to 412 and cellulose acylate films 501 to 506 of Comparative Examples 501 to 506 were produced in the same manner as in Example 401, except that the composition of methylene chloride and methanol, the type and the amount of the hindered amine antioxidant, and the thickness of the film were changed as in Table 6.

Example 413

[Production of Polarizer Protective Film 413]
<Preparation of Silicon Dioxide Dispersion>

The following composition of silicon dioxide dispersion was put into a disperser and stirred therein thereby to prepare a silicon dioxide dispersion.

| (Composition of Silicon Dioxide Dispersion) | |
|---|---|
| Aerosil R812 (by Nippon Aerosil) (mean particle size of primary particles, 7 nm) | 10 mas. pts. |
| Ethanol | 90 mas. pts. |

<Preparation of Silicon Dioxide Dispersion Dilution>

Cellulose acetate having a degree of acetyl substitution of 2.88 was put into a solution tank into which methylene chloride had been put, and completely dissolved therein by heating, and this was filtered through Azumi Filter No. 244 by Azumi Filter. With fully stirring the filtered cellulose acetate solution, the above-mentioned fine particles dispersion was gradually added thereto. Further, this was dispersed with an attritor so that the second particles therein could have a predetermined size. This was filtered through Fine Met NF by Nippon Seisen, thereby preparing a fine particles dispersion dilution.

<Preparation of Dope 1>

| (Composition of Dope 1) | |
|---|---|
| Cellulose acetate having a degree of acetyl substitution of 2.88, produced from linter cotton | 90 mas. pts. |
| Plasticizer A | 6.0 mas. pts. |
| Plasticizer B | 4.0 mas. pts. |
| Tinuvin 384-2 (by BASF) | 1.5 mas. pts. |
| Tinuvin 109 (by BASF) | 1.0 mas. pt. |
| Silicon dioxide dispersion dilution | 4.0 mas. pts. |
| Methylene chloride | 432 mas. pts. |
| Ethanol | 38 mas. pts. |

The above were put into a closed container and completely dissolved with stirring under heat, and filtered through Azumi Filter No. 24 by Azumi Filter, thereby preparing a dope 1.

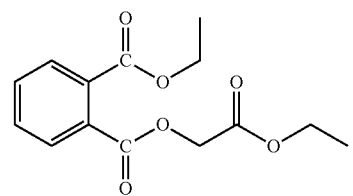

Plasticizer A

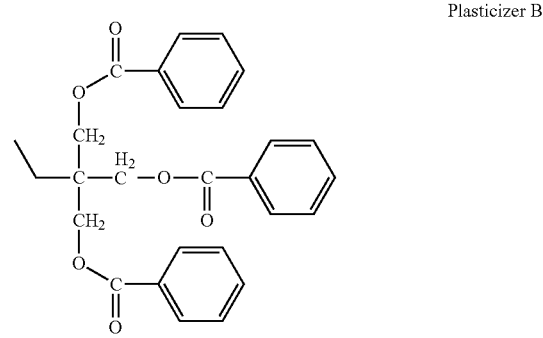

Plasticizer B

Next, using a band casting apparatus, the dope was uniformly cast onto the stainless band support. On the stainless band support, the solvent was evaporated away until the residual solvent amount could reach 100%, and the formed web was peeled away from the stainless band support. The solvent was evaporated away from the web of cellulose acetate film at 35° C., and the web was then cut into a strip having a width of 1.6 m. While stretched in TD (transverse direction of the film) by 1.1 times and in MD by 1.05 times using a tenter, this was dried at a drying temperature of 160° C. At the start of the drying, the residual solvent amount in the web was 20%. Subsequently, while conveyed with a large number of rolls in a drying unit at 120° C., the web was dried for 15 minutes, and then cut into a strip having a width of 1.6 m. On both sides thereof, the film was knurled at a width of 15 mm and a height of 10 μm, then wound up around a winding core thereby producing a polarizer protective film 405. The residual solvent amount in the cellulose acetate film was 0.2%, and the film thickness was 40 μm and the length of the wound film was 4000 m.

Example 414, Comparative Examples 507 and 508

A cellulose acylate film 414 of Example 414 and cellulose acylate films 507 and 508 of Comparative Examples 507 and 508 were produced in the same manner as in Example 413, except that the type and the amount of the hindered amine antioxidant and the film thickness in Example 413 were changed as in Table 6.
(Measurement of Plasticizer Concentration in Cellulose Acylate Film)
The cellulose acylate film was cut obliquely at an angle of 1° relative to the film surface, and the cross section of the thus-cut film was analyzed for mapping with a time-of-flight secondary ion mass spectrometer (TOF-SIMS). In positive measurement, the mean value of the peak intensity of the part corresponding to the outside from the depth 5 μm of the molecular +H$^+$ ion was measured on both the air side and the support side, and the concentration ratio on air-side/support-side was computed.
The results are shown in Table 6 below.
(2) Formation of Active Energy Ray-Curable Layer
<Preparation of Hard Coat Layer Coating Liquid (HC-2)>
A composition comprising the following ingredients was prepared, and filtered through a polypropylene filter having a pore size of 30 μm to prepare a hard coat layer coating liquid (HC-2).
Hard Coat Layer Coating Liquid:

| | |
|---|---|
| Mixture of PET 30 pentaerythritol acrylate and pentaerythritol tetraacrylate(by Nippon Kayaku) (binder) | 53 mas. pts. |
| Ethyl acetate (solvent) | 45 mas. pts. |
| Irgacure 127 (polymerization initiator) (by Ciba Specialty Chemicals) | 2 mas. pts. |

<Formation of Hard Coat Layer>
Onto the surface of the cellulose acylate film formed in the above, which had been kept in contact with the support in film production (hereinafter this is referred to as support-side surface), the hard coat layer coating liquid (HC-2) was applied according to a microgravure coating method at a traveling speed of 30 m/min. After dried at 100° C. for 60 seconds, the coating layer was cured by irradiation with UV rays at an illuminance of 400 mW/cm$^2$ and at an irradiation dose of 300 mJ/cm$^2$ using a 160 W/cm air-cooled metal halide lamp (by Eye Graphics), with purging with nitrogen (oxygen concentration, at most 0.5%), thereby producing a hard coat layer.
Thus produced, the hard coat layer-having polarizer protective film is a polarizer protective film of Example 401.
(3) Production of Polarizer
[Saponification Treatment of Polarizer Protective Film]
The polarizer protective film of Example 401 produced in the above was dipped in an aqueous solution of 1.5 mol/L sodium hydroxide at 55° C. for 2 minutes. This was washed in a water-washing bath at room temperature, and then neutralized with 0.05 mol/L sulfuric acid at 30° C. Again this was washed with a water-washing bath at room temperature and then dried with hot air at 100° C. Accordingly, the surface of the polarizer protective film of Example 401 was saponified.
[Production of Polarizer]
A stretched polyvinyl alcohol film was made to adsorb iodine to prepare a polarizing element.
Using a polyvinyl alcohol adhesive, the saponified polarizer protective film of Example 401 was stuck to one side of the polarizing element in such a manner that the side of the film that had been kept in contact with the support in film production (hereinafter referred to as support-side surface) could face the polarizing element. A commercially-available cellulose triacetate film (Fujitac TD80UF by FUJIFILM) was saponified in the same manner as above, and using a polyvinyl alcohol adhesive, the thus-saponified cellulose triacetate film was stuck to the other side of the polarizing element to which the polarizer protective film of Example 401 had been stuck.
In this, the polarizing element and the polarizer protective film of Example 401 were so arranged that the transmission axis of the former could be perpendicular to the slow axis of the latter. In addition, the polarizing element and the commercially-available triacetate film were also so arranged that the transmission axis of the former could be perpendicular to the slow axis of the latter.
In that manner, a polarizer of Example 401 was produced.
[Production of Polarizer Protective Films of Examples 402 to 414 and Comparative Examples 501 to 508]
Hard coat layer-having polarizer protective films of Examples 402 to 414 and Comparative Examples 501 to 508 were produced in the same manner as in Example 401, except that the surface on which the hard coat layer is to be formed by coating was changed as in Table 6.
[Saponification of Polarizer Protective Film and Production of Polarizer]
Also in the same manner as in Example 501, the polarizer protective films of Examples 402 to 414 and polarizer protective films of Comparative Examples 501 to 508 were saponified, and polarizers of Examples and Comparative Examples were produced.
[Evaluation]
<Evaluation of Adhesiveness>
The hard coat layer-having polarizer protective films of Examples and Comparative Examples produced in the above were irradiated with light, using Suga Test Instruments' Super Xenon Weather Meter SX75, in an environment at 60° C. and at a relative humidity of 50% for 48 hours, 96 hours, and 144 hours.
Next, the hard coat layer-having polarizer protective films were conditioned at a temperature of 25° C. and at a relative humidity of 60% for 2 hours. Using a cutter knife, the hard coat layer-side surface of the film was cut at 11 lines vertically and at 11 lines horizontally to form 100 square cross-cuts in all; and Nitto Denko's polyester adhesive tape No. 31B was stuck to the thus-cut surface. After 30 minutes, the tape was rapidly peeled away in the vertical direction, and the number of the peeled cross-cuts was counted. The tested sample was evaluated according to the following four-rank standards. The same adhesiveness test was repeated three times for one sample, and the data were averaged.
  A: No cross-cut peeled at all.
  B: From 1 to 20 of 100 cross-cuts peeled.
  C: From 21 to 70 of 100 cross-cuts peeled (acceptable level).
  D: 71 or more of 100 cross-cuts peeled.
The obtained results are shown in Table 6 below.

(Evaluation of Polarizer Durability)

In the polarizers of Examples and Comparative Examples produced in the above, the cross transmittance of the polarizing element at a wavelength of 410 nm was measured according to the method described herein.

Subsequently, the polarizers were stored in an environment at 60° C. and at a relative humidity of 95% for 1000 hours, and then the cross transmittance of the polarizing element therein was measured according to the same method as above. The cross transmittance change before and after the storage was computed, and this is the polarizing element durability. The results are shown in Table 6 below. The relative humidity in the non-conditioned environment was within a range of from 0% to 20%.

From the results in the above Table 6, it is known that the polarizer protective films of the invention are favorable since these are free from a trouble of peeling between the hard coat layer and the cellulose acylate film therein even when exposed to light for a long period of time. In particular, the polarizer protective films, in which the cellulose acylate film was produced in a composition of methylene chloride/alcohol of from 92/8 to 80/20, are favorable since in these, the peeling between the hard coat layer and the cellulose acylate film occurred little. In addition, it is also known that the polarizer protective films, in which the hard coat layer was formed on the surface thereof that was on the air side in solution-casting film formation, are especially favorable since in these, the peeling between the hard coat layer and the cellulose acylate film occurred little.

TABLE 6

| | Methylene Chloride weight ratio | Methanol weight ratio | Ethanol weight ratio | Antioxidant type | amount added[a] | Film Thickness (μm) | Plasticizer Concentration Ratio air-side surface/support-side surface | Hard Coat Coated Surface | Surface adjacent to Polarizing Element | Evaluation of Adhesiveness | | |
|---|---|---|---|---|---|---|---|---|---|---|---|---|
| | | | | | | | | | | 48 hours exposure | 96 hours exposure | 144 hours exposure |
| Example 401 | 87 | 13 | 0 | FLAMESTAB NOR 116FF | 2 | 60 | 0.90 | support side | support side | A | A | B |
| Example 402 | 97 | 3 | 0 | FLAMESTAB NOR 116FF | 2 | 60 | 0.93 | support side | support side | A | C | C |
| Example 403 | 92 | 8 | 0 | FLAMESTAB NOR 116FF | 2 | 60 | 0.91 | support side | support side | A | A | A |
| Example 404 | 80 | 20 | 0 | FLAMESTAB NOR 116FF | 2 | 60 | 0.88 | support side | support side | A | B | C |
| Example 405 | 72 | 28 | 0 | FLAMESTAB NOR 116FF | 2 | 60 | 0.86 | support side | support side | B | C | C |
| Example 406 | 92 | 0 | 8 | TINUVIN 123 | 1 | 40 | 0.90 | support side | support side | A | A | B |
| Example 407 | 92 | 0 | 8 | TINUVIN 152 | 1 | 40 | 0.90 | support side | support side | A | A | B |
| Example 408 | 87 | 13 | 0 | FLAMESTAB NOR 116FF | 2 | 60 | 0.90 | air side | air side | A | A | A |
| Example 409 | 97 | 3 | 0 | FLAMESTAB NOR 116FF | 2 | 60 | 0.93 | air side | air side | A | B | C |
| Example 410 | 92 | 8 | 0 | FLAMESTAB NOR 116FF | 2 | 60 | 0.91 | air side | air side | A | A | A |
| Example 411 | 80 | 20 | 0 | FLAMESTAB NOR 116FF | 2 | 60 | 0.88 | air side | air side | A | A | B |
| Example 412 | 72 | 28 | 0 | FLAMESTAB NOR 116FF | 2 | 60 | 0.86 | air side | air side | A | B | C |
| Example 413 | 92 | 0 | 8 | TINUVIN 123 | 1 | 60 | 0.90 | air side | air side | A | A | A |
| Example 414 | 92 | 0 | 8 | TINUVIN 152 | 1 | 60 | 0.90 | air side | air side | A | A | A |
| Comparative Example 501 | 87 | 13 | 0 | no | 0 | 60 | 0.90 | support side | support side | C | D | D |
| Comparative Example 502 | 97 | 3 | 0 | no | 0 | 60 | 0.93 | support side | support side | C | D | D |
| Comparative Example 503 | 72 | 28 | 0 | no | 0 | 60 | 0.86 | support side | support side | C | D | D |
| Comparative Example 504 | 87 | 13 | 0 | no | 0 | 60 | 0.90 | air side | air side | C | D | D |
| Comparative Example 505 | 97 | 3 | 0 | no | 0 | 60 | 0.93 | air side | air side | C | D | D |
| Comparative Example 506 | 72 | 28 | 0 | no | 0 | 60 | 0.86 | air side | air side | C | D | D |
| Comparative Example 507 | 92 | 0 | 8 | no | 0 | 40 | 0.90 | support side | support side | C | D | D |
| Comparative Example 508 | 92 | 0 | 8 | no | 0 | 40 | 0.90 | air side | air side | C | D | D |

[a]Amount in terms of part by mass relative to 100 parts by mass of cellulose acylate.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-227417, filed on Oct. 7, 2010 and Japanese Patent Application No. 2011-179705, filed on Aug. 19, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polarizer protective film having a cellulose acylate film containing a cellulose acylate and a hindered amine compound in an amount of at least 0.01% by mass relative to the cellulose acylate, and, as laminated on the cellulose acylate film, an active energy ray-curable layer,
   wherein the hindered amine compound has a piperidine skeleton represented by the following formula (1):

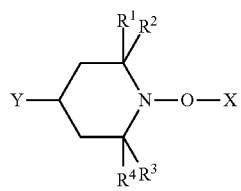

Formula (1)

wherein X represents an alkyl or aryl group optionally having a substituent; Y represents a hydrogen atom or a substituent; $R^1$ to $R^4$ each independently represent an alkyl group,
wherein the cellulose acylate film contains an organic acid that has an acid dissociation constant in a mixed solvent of tetrahydrofuran/water =6/4 by volume at 25° C. of from 2 to 7,
wherein an amount of the organic acid is from 1 to 20% by mass of the cellulose acylate used in the cellulose acylate film,
wherein a total degree of acyl substitution of the cellulose acylate is from 2.7 to less than 2.97, and wherein the organic acid is represented by the following formula (7):

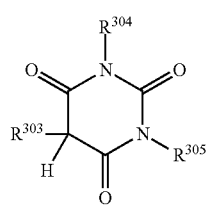

Formula (7)

wherein $R^{303}$ represents an aryl group; $R^{304}$ and $R^{305}$ each independently represent a hydrogen atom, an alkyl group, or an aryl group, and $R^{304}$ and $R^{305}$ each may have a substituent.

2. The polarizer protective film according to claim 1, wherein the hindered amine compound is represented by the following formula (2):

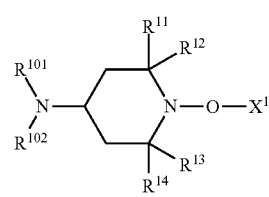

Formula (2)

wherein $X^1$ represents an alkyl or aryl group optionally having a substituent; $R^{11}$ to $R^{14}$ each independently represent an alkyl group; $R^{101}$ represents a hydrogen atom, an alkyl group, an aryl group or a heterocyclic group; $R^{102}$ represents an alkyl group, an aryl group or a heterocyclic group.

3. The polarizer protective film according to claim 1, wherein the hindered amine compound is represented by the following formula (3):

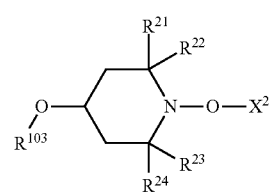

Formula (3)

wherein $X^2$ represents an alkyl or aryl group optionally having a substituent; $R^{21}$ to $R^{24}$ each independently represent an alkyl group; $R^{103}$ represents a hydrogen atom, an alkyl group, an acyl group or an aryl group.

4. The polarizer protective film according to claim 1, wherein the hindered amine compound is represented by the following formula (4):

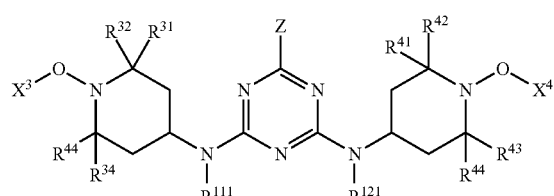

Formula (4)

wherein $X^3$ and $X^4$ each independently represents an alkyl or aryl group optionally having a substituent; $R^{31}$ to $R^{34}$ and $R^{41}$ to $R^{44}$ each independently represent an alkyl group; $R^{111}$ and $R^{121}$ each independently represent a hydrogen atom, an alkyl group, an aryl group or a heterocyclic group; Z represents a monovalent substituent.

5. The polarizer protective film according to claim 1, wherein the hindered amine compound is represented by the following formula (5):

Formula (5)

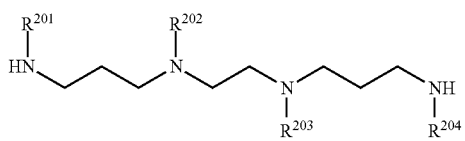

wherein R²⁰¹ to R²⁰⁴ each independently represent a hydrogen atom or a substituent represented by the following formula (P), and at least one of R²⁰¹ to R²⁰⁴ is the substituent represented by the following formula (P):

Formula (P)

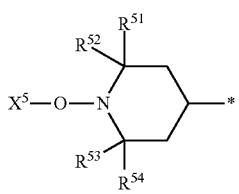

wherein X⁵ represents an alkyl or aryl group optionally having a substituent; R⁵¹ to R⁵⁴ each independently represent an alkyl group; * represents a linking position.

6. The polarizer protective film according to claim 1, wherein the hindered amine compound has a structure selected from the group consisting of the following structures:

A-1

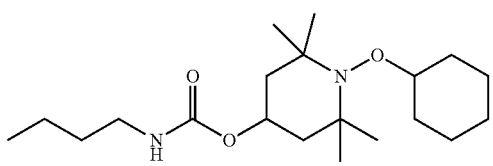

A-2

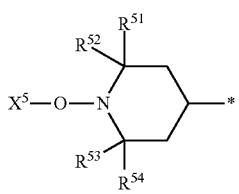

A-3

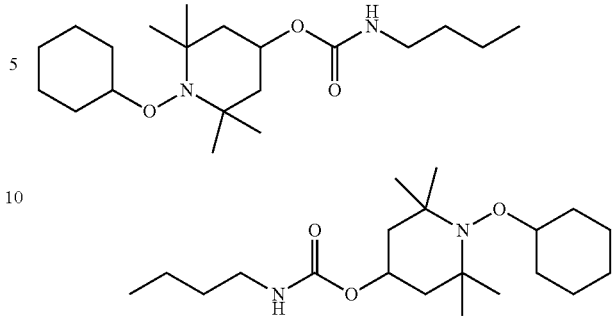

A-4

A-5

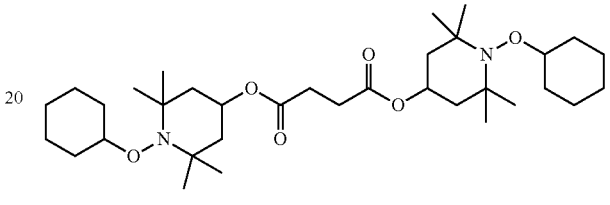

A-6

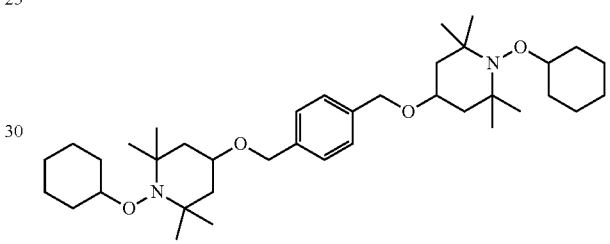

A-7

A-8

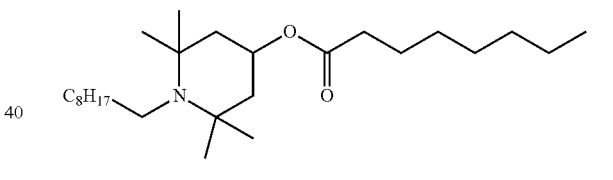

A-9

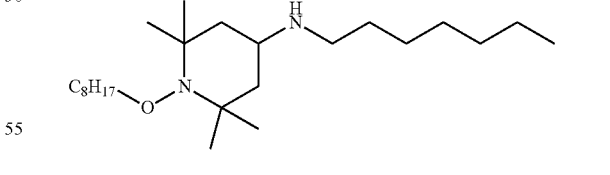

-continued
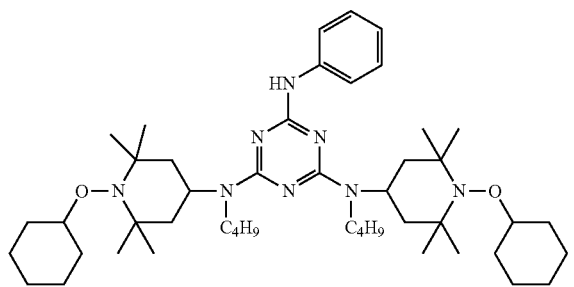
A-10
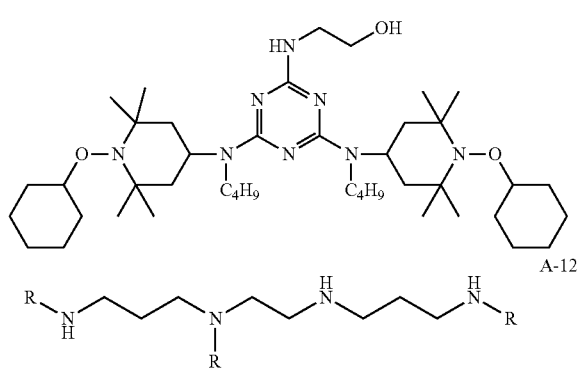
A-11
A-12
-continued
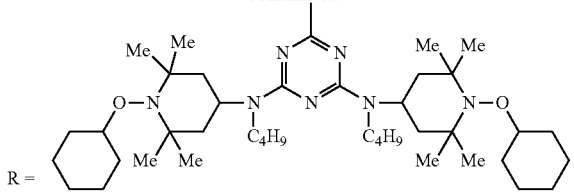
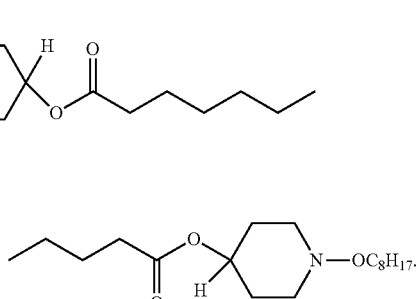
A-13
7. The polarizer protective film according to claim 1, wherein the hindered amine compound has the following structure:
A-13
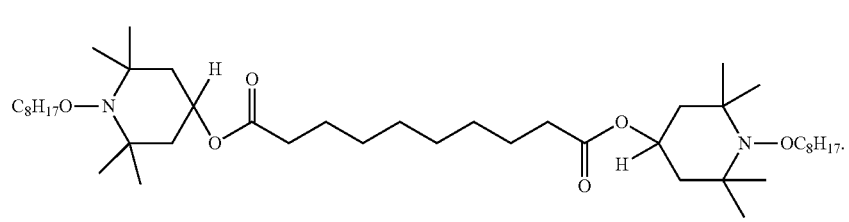
* * * * *